(12) United States Patent
Jitsukawa et al.

(10) Patent No.: US 10,498,468 B2
(45) Date of Patent: Dec. 3, 2019

(54) BASE STATION, WIRELESS COMMUNICATION SYSTEM, AND CALIBRATION METHOD OF WIRELESS COMMUNICATION SYSTEM

(71) Applicant: FUJITSU LIMITED, Kawasaki-shi, Kanagawa (JP)

(72) Inventors: Daisuke Jitsukawa, Adachi (JP); Takashi Dateki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 15/461,124

(22) Filed: Mar. 16, 2017

(65) Prior Publication Data

US 2017/0272180 A1 Sep. 21, 2017

(30) Foreign Application Priority Data

Mar. 18, 2016 (JP) .................................. 2016-055954

(51) Int. Cl.
*H04B 17/14* (2015.01)
*H04L 5/14* (2006.01)
*H04L 5/00* (2006.01)
*H04B 17/12* (2015.01)
*H04B 17/21* (2015.01)
*H04B 17/11* (2015.01)
*H04B 7/024* (2017.01)

(52) U.S. Cl.
CPC ............ *H04B 17/21* (2015.01); *H04B 7/024* (2013.01); *H04B 17/11* (2015.01); *H04B 17/14* (2015.01); *H04L 5/0023* (2013.01); *H04L 5/1461* (2013.01); *H04L 5/1469* (2013.01); *H04B 17/12* (2015.01)

(58) Field of Classification Search
None
See application file for complete search history.

(56) References Cited

U.S. PATENT DOCUMENTS

| 8,891,598 | B1 * | 11/2014 | Wang | H04L 25/0398 |
| | | | | 370/241 |
| 2012/0207055 | A1 | 8/2012 | Kang et al. | |
| 2012/0208584 | A1 * | 8/2012 | Liao | H04B 17/0007 |
| | | | | 455/509 |

(Continued)

FOREIGN PATENT DOCUMENTS

| JP | 2011-199850 A | 10/2011 |
| JP | 2013-509082 A | 3/2013 |

(Continued)

OTHER PUBLICATIONS

Nishimori, Kentaro, et al., "A Real-Time Calibration Method of Adaptive Arrays for TDD Systems", A P99-3, IEICE Technical Report, pp. 17-22, Apr. 1999, with English Abstract.

(Continued)

*Primary Examiner* — Ajit Patel
(74) *Attorney, Agent, or Firm* — Arent Fox LLP

(57) ABSTRACT

According to one aspect, a base station that is connected to a plurality of transmission and reception points includes a calibrator. The calibrator calculates calibration coefficients to be multiplied on weights in beamforming communication at each of a plurality of transmission and reception points based on the beamforming communication at each of a plurality of transmission and reception points.

15 Claims, 17 Drawing Sheets

(56) References Cited

U.S. PATENT DOCUMENTS

| | | | |
|---|---|---|---|
| 2013/0114425 A1* | 5/2013 | Sayana | H04B 7/024 370/252 |
| 2013/0114459 A1* | 5/2013 | Luo | H04W 24/00 370/252 |
| 2014/0112295 A1 | 4/2014 | Xu et al. | |
| 2014/0269554 A1* | 9/2014 | Shapira | H04B 17/0007 370/329 |
| 2014/0341144 A1* | 11/2014 | Zhang | H04L 5/006 370/329 |
| 2015/0270880 A1* | 9/2015 | Harel | H04L 5/0073 370/338 |
| 2015/0349942 A1 | 12/2015 | Chatterjee et al. | |
| 2016/0099762 A1* | 4/2016 | Wu | H04L 25/0398 370/329 |
| 2016/0119909 A1* | 4/2016 | Fukuzono | H04W 16/28 370/329 |
| 2016/0135180 A1* | 5/2016 | Yuan | H04B 7/0617 370/329 |
| 2016/0191176 A1* | 6/2016 | O'Keeffe | H01Q 3/267 455/63.4 |
| 2016/0211898 A1* | 7/2016 | Cai | H04B 7/0617 |
| 2016/0241323 A1* | 8/2016 | Ko | H04B 7/0691 |
| 2017/0085005 A1* | 3/2017 | Aue | H04B 1/40 |

FOREIGN PATENT DOCUMENTS

| | | |
|---|---|---|
| JP | 2013-534380 A | 9/2013 |
| JP | 2014-525165 A | 9/2014 |
| JP | 2016-055954 A | 4/2016 |
| WO | WO 2011-155360 A1 | 12/2011 |

OTHER PUBLICATIONS

Nouda, Yasunori, et al., "An Antenna Array Auto-Calibration Method with Bidirectional Channel Measurement for TDD Systems", RCS2008-12, IEICE Technical Report, pp. 69-74, May 2008, with English Abstract.

Fukuzono, Hayato, et al., "Weighted-Combining Calibration for Implicit Feedback Beamforming on Downlink Multiuser MIMO Systems", PIMRC 2013, Jun. 2013.

Huang, Fan, et al., "Antenna Mismatch and Calibration Problem in Coordinated Multi-Point Transmission System", IET Commun, vol. 6, Iss. 3, pp. 289-299, 2012.

Office Action of Japanese Patent Application No. 2016-055954 dated Oct. 23, 2019.

\* cited by examiner

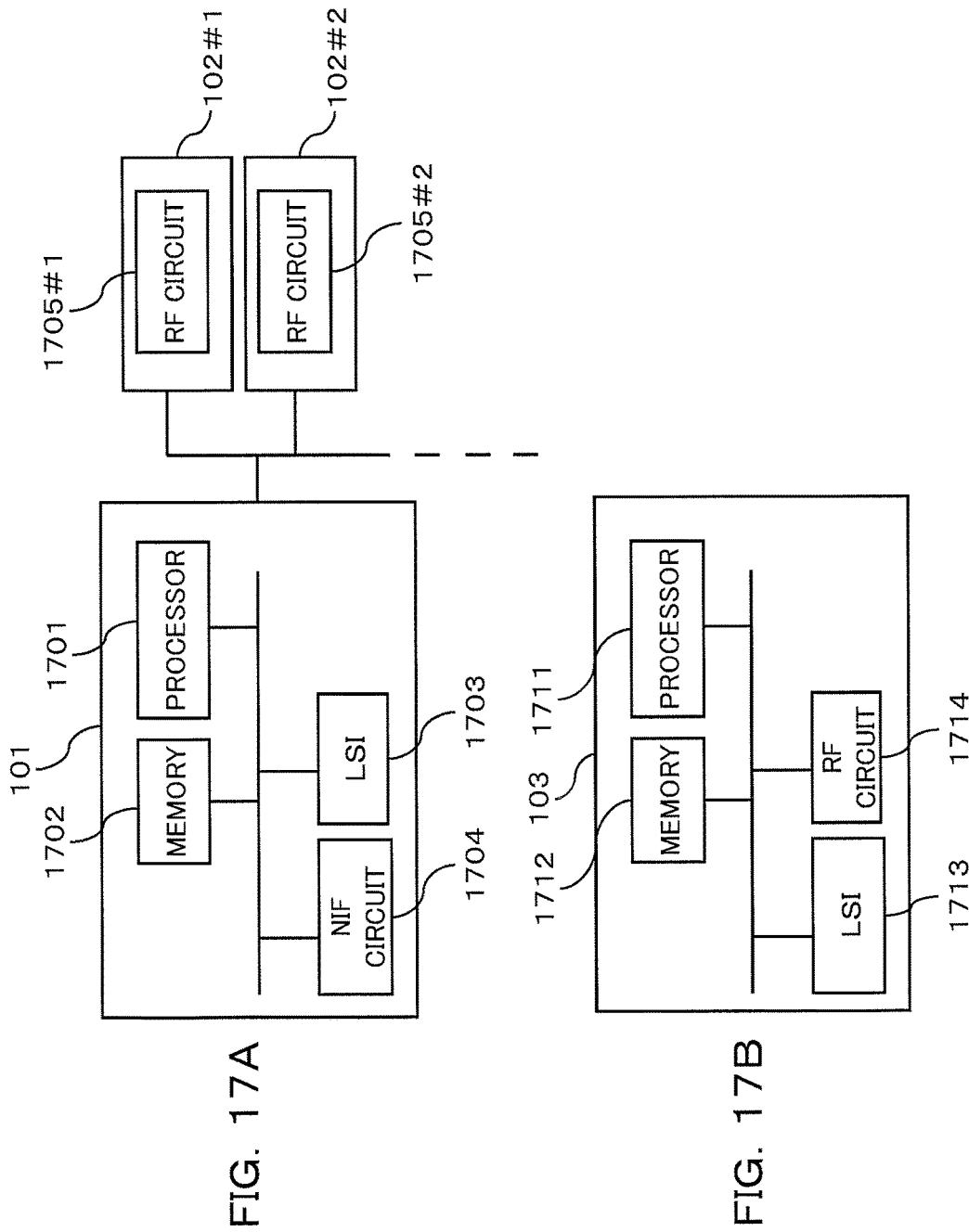

BASE STATION, WIRELESS COMMUNICATION SYSTEM, AND CALIBRATION METHOD OF WIRELESS COMMUNICATION SYSTEM

CROSS-REFERENCE TO RELATED APPLICATION

This application is based upon and claims the benefit of priority of the prior Japanese Patent Application No. 2016-055954, filed on Mar. 18, 2016, the entire contents of which are incorporated herein by reference.

FIELD

The present disclosure relates to a base station, a wireless communication system and a calibrating method.

BACKGROUND

In mobile wireless communication, a channel state (wireless characteristics) of a radio channel between a base station and a wireless terminal changes according to a time, and changes according to a frequency, too. Hence, channel states of a downlink radio channel from the base station to the wireless terminal and an uplink radio channel from the wireless terminal to the base station are estimated.

When the base station and the wireless terminal communicate by way of time divisional duplex, the channel states of the uplink radio channel and the downlink radio channel can be estimated to be equivalent.

However, the channel states of the uplink radio channel and the downlink radio channel which can be estimated to be equivalent are channel states of the radio channel in air between an antenna of the base station and an antenna of the wireless terminal. Meanwhile, the radio channels estimated by the base station and the wireless terminal include response characteristics (transfer function) of a wireless transmission/reception circuit between a channel estimator and the antenna, and therefore the channel states of the uplink radio channel and the downlink radio channel are not actually estimable as being equivalent in some cases. Hence, the wireless transmission/reception circuit is calibrated to able to estimate that the channel states of the uplink radio channel and the downlink radio channel are equivalent.

Patent Document 1: Japanese Laid-open Patent Publication No. 2013-534380
Patent Document 2: International Publication Pamphlet No. WO 2011/155360
Patent Document 3: Japanese Laid-open Patent Publication No. 2011-199850
Patent Document 4: Japanese Laid-open Patent Publication No. 2013-509082
Non-Patent Document 1: K. Nishimori, K. Cho, Y. TAKATORI, and T. Hori, "A Real-Time Calibration Method of Adaptive Arrays for TDD Systems" A•P99-3, IEICE technical report, pp 17-22, April 1999.
Non-Patent Document 2: Y. Nouda, Y. Hara, Y. Yano, H. KUBO, "An Antenna Array Auto-Calibration Method with Bidirectional Channel Measurement for TDD Systems", RCS2008.12, IEICE technical report, pp 69-74, May 2008.
Non-Patent Document 3: H. Fukuzono, et al, "Weighted-combining calibration for implicit feedback beamforming on downlink multiuser MIMO systems," PIMRC 2013, June 2013.
Non-Patent Document 4: F. Huang, Y. Wang, J. Geng, D. Yang, "Antenna mismatch and calibration problem in coordinated multi-point transmission system," IET Commun, 2012, Vol. 6, Iss 3, pp. 289-299.

When a base station is connected to a plurality of transmission and reception points, and the plurality of transmission and reception points communicate with a wireless terminal in a coordinated manner, radio signals received by the wireless terminal from the plurality of transmission and reception points are preferably equivalent. Hence, it is may be demanded to accurately calibrate the base station connected to the plurality of transmission and reception points.

SUMMARY

According to an aspect of the embodiments, a base station that is connected to a plurality of transmission and reception points includes a calibrator. The calibrator calculates calibration coefficients for correcting weights in beamforming communication at each of the plurality of transmission and reception points based on the beamforming communication at each of the plurality of transmission and reception points.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17A is a hardware configuration diagram of a base station and a transmission and reception point; and FIG. 17B is a hardware configuration diagram of a wireless terminal.

DESCRIPTION OF EMBODIMENTS

Figure 1:
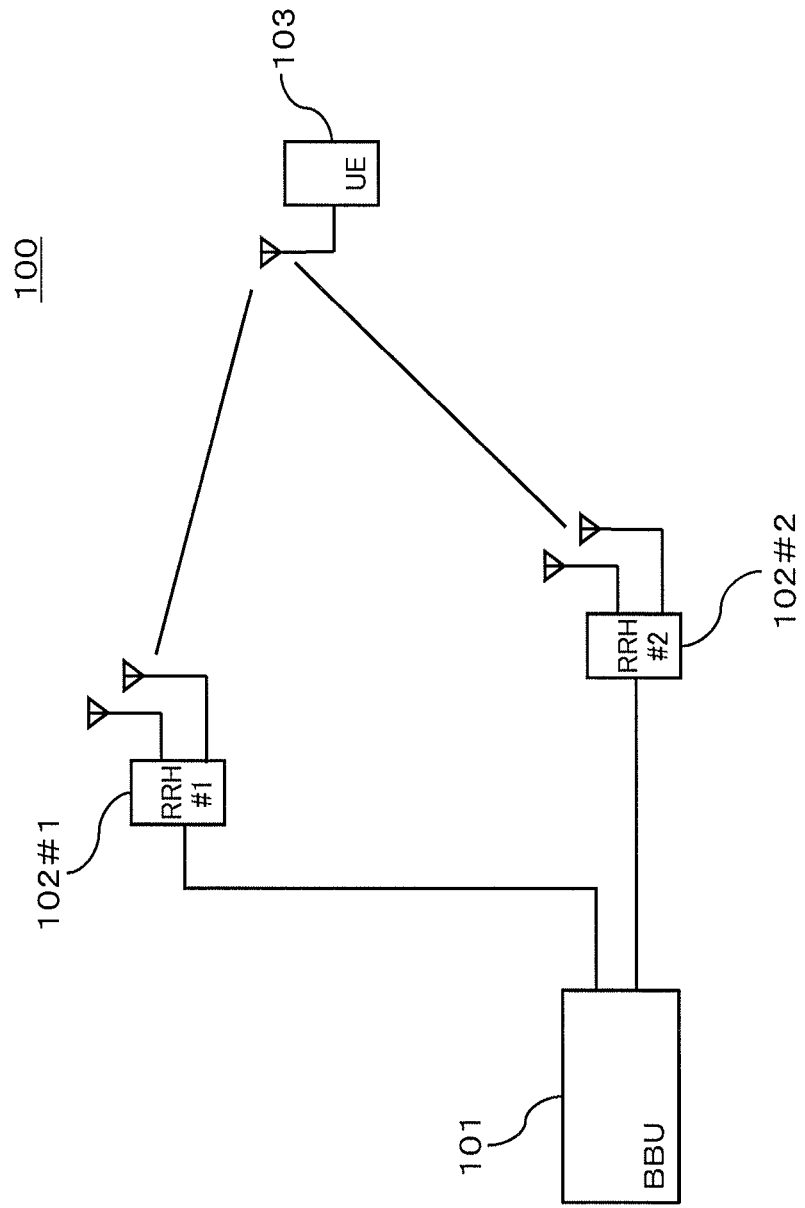
FIG. 1 is an entire diagram of a wireless communication system according to a first embodiment.

Hereinafter, embodiments of the present invention will be described with reference to the drawings. The embodiments discussed below, however, are merely exemplary, and it is not intended to exclude various modifications to and applications of the techniques. For example, the present embodiments may be practiced in a wide variety of modification without departing from the spirit thereof. In addition, components having the same names will be assigned the same reference numerals, and will be described. Further, a plurality of the same components illustrated in one drawing will be assigned #1, #2 and . . . to distinguish.

First Embodiment

FIG. 1 is an entire diagram of a communication system according to a first embodiment. A wireless communication system 100 includes a base station 101, transmission and reception points 102#1 and 102#2 and a wireless terminal 103.

The base station 101 is connected with the transmission and reception points 102#1 and 102#2. The base station 101 and the transmission and reception points 102#1 and 102#2 are connected by using one or more of wired communication such as optical fibers and wireless communication such as microwave lines. Each of the transmission and reception points 102#1 and 102#2 forms a wireless area.

When the wireless terminal 103 is located in the wireless area, the transmission and reception point which forms the wireless area, and the wireless terminal 103 can communicate. In FIG. 1, the wireless terminal 103 and the transmission and reception points 102#1 and 102#2 can communicate. Consequently, the transmission and reception points 102#1 and 102#2 can communicate with the wireless terminal 103 in a coordinated manner. In addition, that the wireless terminal 103 can communicate with the transmission and reception points 102#1 and 102#2 represents that the wireless terminal 103 is located in an area of the base station 101.

The base station 101 is connected with a core network, too, and relays communication between the core network and the transmission and reception points 102#1 and 102#2.

In multiple wireless communication systems, the base station 101 executes processing of a baseband signal, and the transmission and reception points 102#1 and 102#2 executes processing of converting the baseband signal and a radio signal and a radio signal processing. In other words, when the base station 101 generates the baseband signal and transmits the generated baseband signal to the transmission and reception points 102#1 and 102#2, the transmission and reception points 102#1 and 102#2 convert radio signals and transmit the radio signals to the wireless terminal 103. Further, when receiving the radio signals from the wireless terminal 103, the transmission and reception points 102#1 and 102#2 convert the radio signals into baseband signals and transmit the converted baseband signals to the base station 101, and the base station 101 executes the processing of the baseband signals.

The wireless terminal 103 is a device which performs wireless communication with a transmission and reception point which forms a wireless area. As described above, in FIG. 1, the wireless terminal 103 can perform wireless communication with the transmission and reception points 102#1 and 102#2.

The base station 101 may be referred to as a BBU (Base Band Unit), a C-BBU (Centralized Base Band Unit), a baseband station and a control station in various ways. The transmission and reception points 102#1 and 102#2 may be referred to as a RRH (Remote Radio Head) and a TP (Transmission Point) in various ways. The base station 101 and the transmission and reception points 102#1 and 102#2 may be collectively referred to as a Node B (NodeB or NB) and an evolved Node B (eNodeB) in various ways. Further, the wireless terminal 103 may be referred to as a user equipment (UE), a mobile station (MS), a user terminal and a subscriber station in various ways.

Figure 2A:
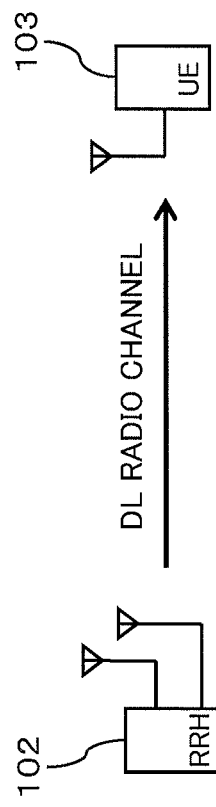
FIG. 2A is a diagram illustrating an example where a radio signal is transmitted from a transmission and reception point to a wireless terminal via a DL (Down Link) radio channel.
Figure 2B:
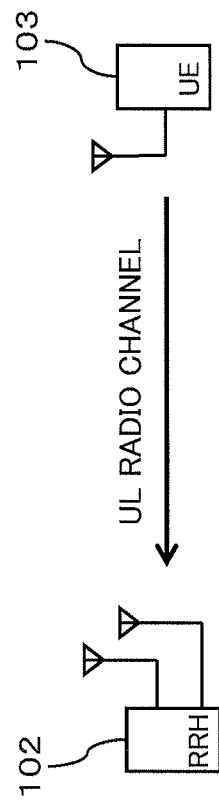
FIG. 2B is a diagram illustrating an example where a radio signal is transmitted from a wireless terminal to a transmission and reception point via an UL (Up Link) radio channel.

FIGS. 2A and 2B illustrate examples of communication between the transmission and reception point 102 and the wireless terminal 103. In FIG. 2A, a radio signal is transmitted from the transmission and reception point 102 to the wireless terminal 103 through a DL (downlink) radio channel. Further, in FIG. 2B, a radio signal is transmitted from the wireless terminal 103 to the transmission and reception point 102 through an UL (uplink) radio channel.

It is assumed that the transmission and reception point 102 and the wireless terminal 103 perform time divisional duplex (TDD) communication. In this case, the transmission and reception point 102 and the wireless terminal 103 communicate by using the same frequency. Consequently, the DL radio channel and the UL radio channel can be regarded as the same channel. Consequently, wireless characteristics of the DL radio channel and the UL radio channel can be regarded as the same wireless characteristics.

The wireless characteristics of the DL radio channel and the UL radio channel can be regarded as the same wireless characteristics, so that the base station 101 connected to the transmission and reception point 102 can estimate a detailed channel state of the DL radio channel based on the wireless characteristics (channel state) of the UL radio channel estimated by using an UL reference signal and the like from the wireless terminal 103. Consequently, the base station 101 connected to the transmission and reception point 102 can perform transmission and reception beamforming by multiplying a DL data signal with a weight. Further, the wireless terminal 103 does not need to report the channel state of the downlink radio channel, so that it is possible to reduce an overhead of a control signal.

However, in reality, a transmitter/receiver estimates a channel state of a radio channel. Hence, the channel state of the radio channel to be estimated is a channel state (channel states of a transmitter and a receiver) which is a mixture of an inter-antenna channel state and the channel state of the transmitter/receiver.

Figure 3:
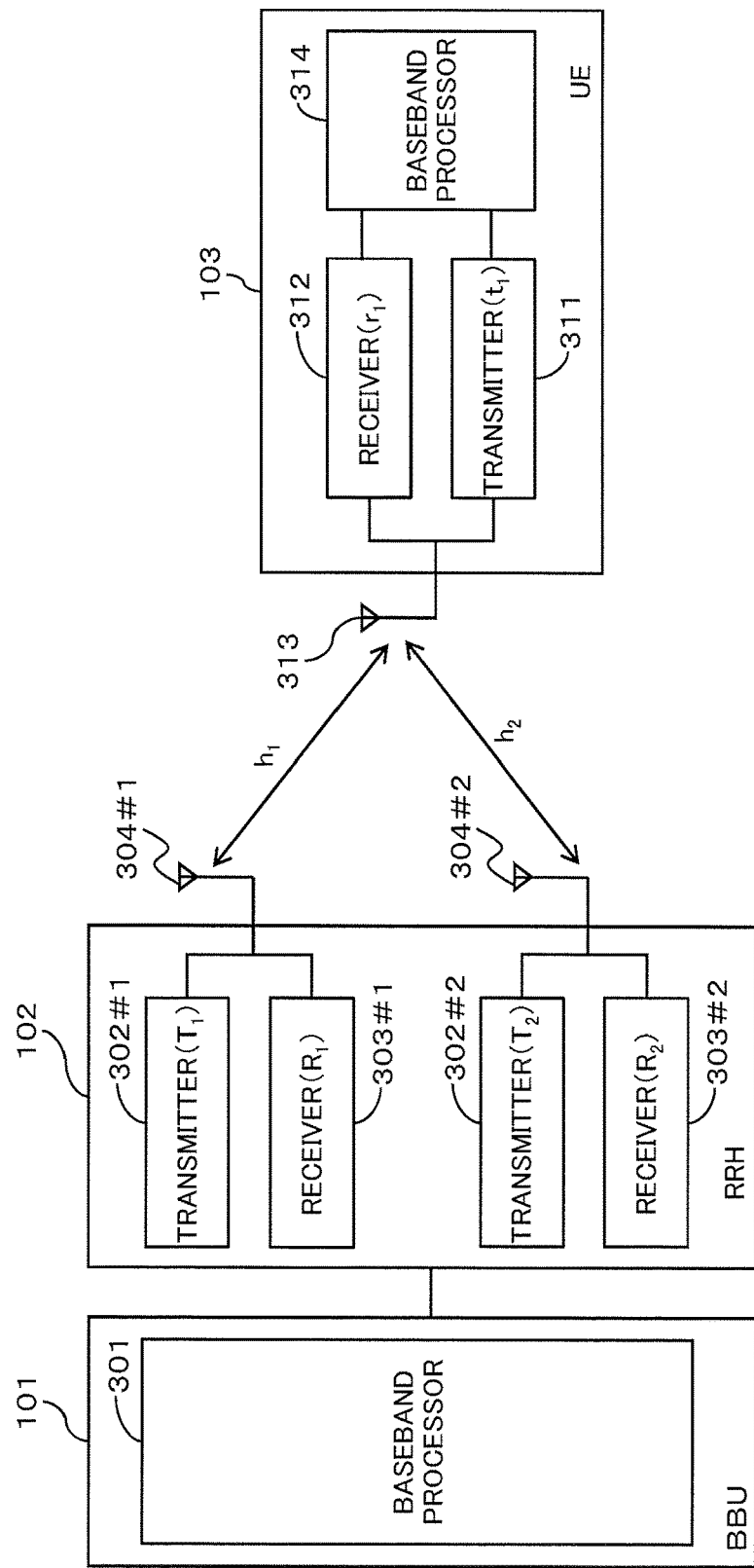
FIG. 3 is a functional block diagram of a base station, a transmission and reception point and a wireless terminal of the wireless communication system according to the first embodiment.

FIG. 3 illustrates an example of a functional block diagram of the base station 101, the transmission and reception point 102 and the wireless terminal 103 of the wireless communication system 100.

The transmission and reception point 102 includes a transmitter 302#1 and a receiver 303#1, and a transmitter 302#2 and a receiver 303#2, respectively, in association with each of antennas 304#1 and 304#2. The base station 101 includes a baseband processor 301. The wireless terminal 103 includes a transmitter 311, a receiver 312, and a baseband processor 314.

$T_1$ and $R_1$ represent response characteristics of the transmitter 302#1 and the receiver 303#1 connected with the antenna 304#1, respectively, and $T_2$ and $R_2$ represent response characteristics of the transmitter 302#2 and the receiver 303#2 connected with the antenna 304#2, respectively. In other words, $T_1$ represents response characteristics from an input of a baseband signal to the transmitter 302#1, to transmission of a radio signal from the antenna 304#1. Similarly, $R_1$ represents response characteristics from a reception of a radio signal at the antenna 304#1 to an output of a baseband signal from the receiver 303#1. The same also applies to $T_2$ and $R_2$, too.

Further, $h_1$ represents a channel state of a radio channel between the antenna 304#1 and an antenna of the wireless terminal 103, and $h_2$ represents a channel state of a radio channel between the antenna 304#2 and the antenna of the wireless terminal 103. Further, $t_1$ represents response characteristics of the transmitter 311 of the wireless terminal 103, and $r_1$ represents response characteristics of the receiver 312.

$f_{DL}^{(1)}$ represents a channel state from an input of a baseband signal to the transmitter 302#1, to an output of a baseband signal of the receiver 312, estimated by the baseband processor 314 of the wireless terminal 103. Further, $f_{DL}^{(2)}$ represents a channel state from an input of a baseband signal to the transmitter 302#2, to an output of a baseband signal of the receiver 312, estimated by the baseband processor 314 of the wireless terminal 103. $f_{DL}^{(1)}$ and $f_{DL}^{(2)}$ are one example of downlink wireless characteristics. In this case, $f_{DL}^{(1)}$ and $f_{DL}^{(2)}$ are as follows:

$$f_{DL}^{(1)} = T_1 \times h_1 \times r_1 \quad \text{(Formula 1)}$$

$$f_{DL}^{(2)} = T_2 \times h_2 \times r_1 \quad \text{(Formula 2)}$$

Further, $f_{UL}^{(1)}$ represents a channel state from an input of a baseband signal to the transmitter 311, to an output of a baseband signal of the receiver 303#1, estimated by the baseband processor 301 of the base station 101. Furthermore, $f_{UL}^{(2)}$ represents a channel state from an input of a baseband signal to the transmitter 311, to an output of the baseband signal of the receiver 303#2, estimated by the baseband processor 301 of the base station 101. $f_{UL}^{(1)}$ and $f_{UL}^{(2)}$ are one example of uplink wireless characteristics. In this case, $f_{UL}^{(1)}$ and $f_{UL}^{(2)}$ are as follows:

$$f_{UL}^{(1)} = t_1 \times h_1 \times R_1 \quad \text{(Formula 3)}$$

$$f_{UL}^{(2)} = t_1 \times h_2 \times R_2 \quad \text{(Formula 4)}$$

Hence, when at least one of $T_1 \neq R_1$, $T_2 \neq R_2$, $t_1 \neq r_1$ and $t_2 \neq r_2$ is satisfied, $f_{DL}^{(1)} = f_{UL}^{(1)}$ and $f_{DL}^{(2)} = f_{UL}^{(2)}$ are not always satisfied. Hence, the DL radio link channel and the UL radio link channel are not possible to regard as the same channel.

Consequently, even when a channel state of the DL radio channel is estimated based on an estimated channel state of the UL radio channel, the channel state of the DL radio channel is not accurately estimated, precoding is not optimally performed in the DL radio channel, and communication characteristics deteriorate.

Hence, it is preferable that calibration is performed according to the response characteristics of the transmitter 302 and the receiver 303 of the transmission and reception point 102. In other words, it is preferable that correction is performed by using calibration coefficients obtained by calibration to multiply a precoding matrix of a precoder or a transmission/reception weight with the calibration coefficients, or further multiply a baseband signal with the calibration coefficient.

Figure 4:
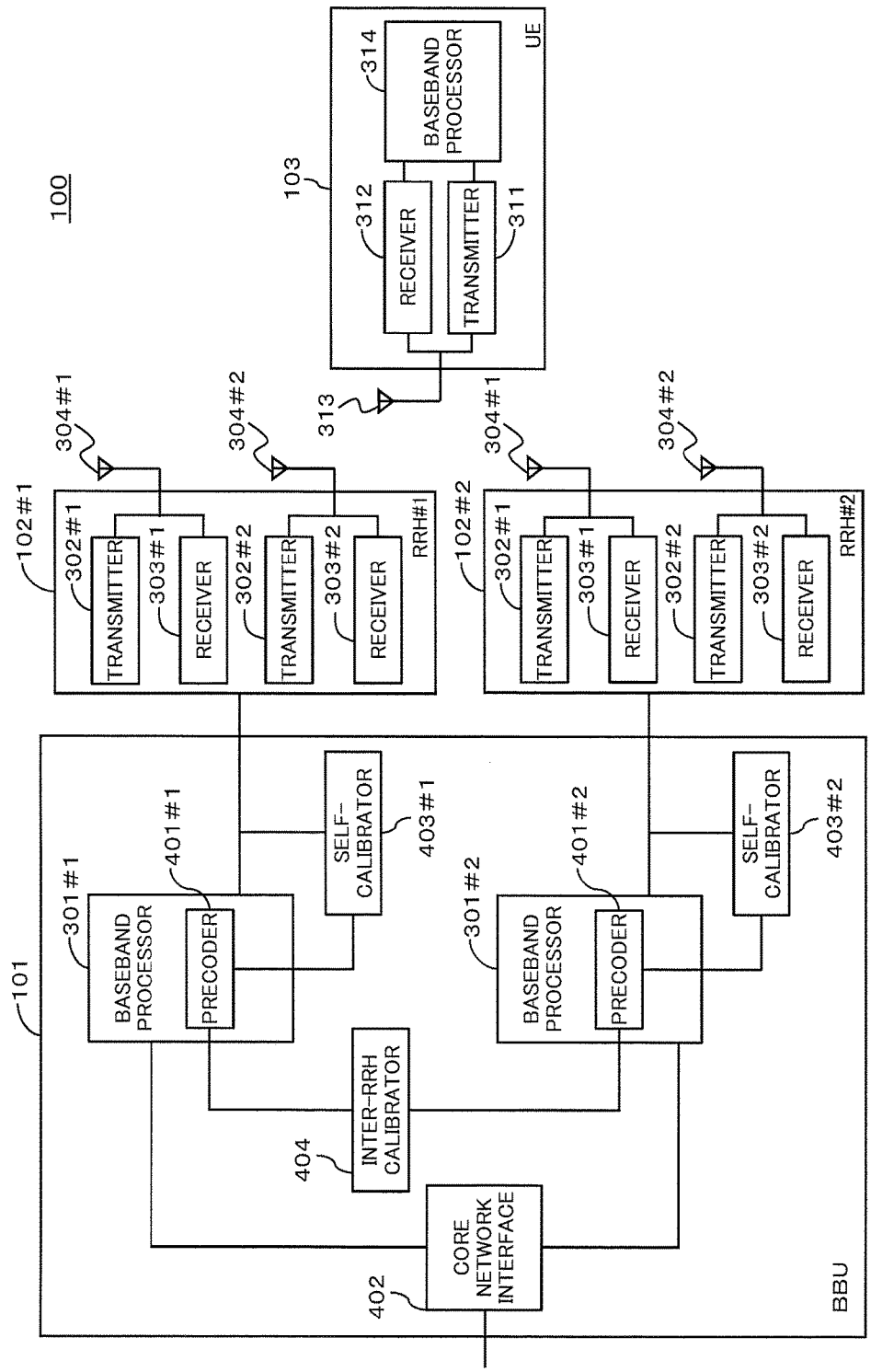
FIG. 4 is a functional block diagram of the base station, the transmission and reception point and the wireless terminal of the wireless communication system according to the first embodiment.

FIG. 4 is a detailed functional block diagram of the base station 101, the transmission and reception points 102#1 and 102#2 and the wireless terminal 103 of the wireless communication system 100 according to the present embodiment.

As illustrated in FIG. 3, the wireless terminal 103 includes the antenna 313, the transmitter 311, the receiver 312 and the baseband processor 314. A radio signal received at the antenna 313 is outputted to the receiver 312, and is converted into a baseband signal, and the converted baseband signal is outputted to the baseband processor 314. Further, the baseband signal outputted from the baseband processor 314 to the transmitter 311 is converted into a radio signal, and the converted radio signal is transmitted from the antenna 313. Furthermore, the baseband processor 314 can perform channel estimation on the downlink radio channel.

Each of the transmission and reception points 102#1 and 102#2 includes the transmitters 302#1 and 302#2 and the receivers 303#1 and 303#2. Each of the transmitters 302#1 and 302#2 and the receivers 303#1 and 303#2 is a wireless circuit which executes a processing of converting a baseband signal into a radio signal, and a radio signal processing.

The base station 101 includes baseband processors 301#1 and 301#2, a core network interface 402, self-calibrators 403#1 and 403#2 and an inter-RRH calibrator 404. Further, each of the baseband processors 301#1 and 301#2 includes precoders 401#1 and 401#2, respectively. Note that the inter-RRH calibrator 404 may be also referred to simply as a calibrator.

The core network interface 402 is an interface between the baseband processors 301#1 and 301#2 and the core network. In other words, each of the baseband processors 301#1 and 301#2 can communicate with the core network via the core network interface 402.

The baseband processor 301#1 can receive an input of a baseband signal and output the baseband signal from and to the transmission and reception point 102#1, and can communicate with the baseband processor 314 of the wireless terminal 103 via the transmission and reception point 102#1, the receiver 312 and the transmitter 311.

Further, the baseband processor 301#2 can receive an input of a baseband signal and output a baseband signal from and to the transmission and reception point 102#2, and can communicate with the baseband processor 314 of the wireless terminal 103 via the transmission and reception point 102#2, the receiver 312 and the transmitter 311.

The self-calibrator 403#1 is connected to the transmission and reception point 102#1. The self-calibrator 403#1 calibrates the transmitters 302#1 and 302#2 and the receivers 303#1 and 303#2 of the transmission and reception point 102#1. Further, the self-calibrator 403#2 is connected to the transmission and reception point 102#2. The self-calibrator 403#2 calibrates the transmitters 302#1 and 302#2 and the receivers 303#1 and 303#2 of the transmission and reception point 102#2.

Calibration performed by the self-calibrators 403#1 and 403#2 is referred to as self-calibration. A self-calibration coefficient obtained as a result of self-calibration is set to, for example, a precoder (beamformer) 401 of the baseband processor 301. The precoder 401 is a unit which for multiplying a baseband signal inputted in and outputted from the baseband processor with a weight, and directing a beam toward a predetermined direction. When the self-calibration coefficient is set to the precoder 401, the self-calibration coefficient is multiplied on the weight to make correction. Further, the calibration coefficient can be set to the precoder 401 and, in addition, to the transmission and reception point 102. By setting the calibration coefficient to the transmission and reception point 102, a circuit constant or the like is corrected.

Self-calibration according to the present embodiment is performed by multiplying the response characteristics $T_1$ and $T_2$ of the transmitter 302#1 and 302#2 with self-calibration coefficients $u_1$ and $u_2$, respectively, as disclosed in above Non-patent Document 2. Each of self-calibration coefficients $u_1$ and $u_2$ is determined such that a ratio of above (Formula 1) and (Formula 3) is the same as a ratio of above (Formula 2) and (Formula 4). In other words, $u_1$ and $u_2$ are determined such that $u_1 \times (f_{DL}^{(1)}/f_{UL}^{(1)}) = u_2 \times (f_{DL}^{(2)}/f_{DL}^{(2)})$ is satisfied. The following equation is obtained by using (Formula 1) to (Formula 4).

$$u_1 \times (T_1 \times h_1 \times r_1)/(t_1 \times h_1 \times R_1) = u_2 \times (T_2 \times h_2 \times r_1)/(t_1 \times h_2 \times R_2)$$

When the above equation is satisfied, channel characteristics in a range including the transmitters and the receivers differs by a constant multiple between the DL radio channel and the UL radio channel, so that the channel characteristics of the DL radio channel and the UL radio channel can be regarded as the same. The above equation is simplified as follows.

$$u_1 \times T_1/R_1 = u_2 \times T_2/R_2$$

Hence, $u_2/u_1 = (T_1/R_1)/(T_2/R_2)$ holds.

Each of the self-calibrators 403#1 and 403#2 outputs a self-calibration coefficient calculated based on $u_1$ and $u_2$ to each of the precoders 401#1 and 401#2. This is equivalent to that, when, for example, precoders 401#1 and 401#2 perform precoding, a weight is multiplied on a baseband signal transmitted to the transmitter 302#2 and $u_2/u_1$ is further multiplexed on the baseband signal.

In other words, this is as follows. When $So_{\#2}$ represents a signal of outputs of the precoder 401 outputted to the transmitter 302#2, an output to the transmitter 302#2 is corrected such that $(u_2/u_1) \times So_{\#2}$ is outputted.

A specific process of self-calibration will be described below.

After finishing self-calibrating of the transmission and reception points 102#1 and 102#2, the inter-RRH calibrator 404 calibrates the transmission and reception points 102#1 and 102#2. This calibration will be referred to as inter-RRH calibration (or inter-transmission and reception point calibration).

The inter-RRH calibration is performed by performing beamforming from each of the transmission and reception points 102#1 and 102#2 to transmit and receive calibration signals to and from the wireless terminal 103. Self-calibration of each of the transmission and reception points 102#1 and 102#2 is finished before the inter-RRH calibration is performed, so that it is possible to more accurately perform beamforming compared to beamforming performed before self-calibration. In addition, a predetermined reference signal can be used as a calibration signal.

When the transmission and reception point 102#1 can perform accurate beamforming with respect to the wireless terminal 103, the wireless terminal 103 can regard a radio signal from the antenna 304#1 and a radio signal from the antenna 304#2 as the same. Further, the baseband processor 301#1 can regard a baseband signal from the receiver 303#1 and a baseband signal from the receiver 303#2 as the same. The same applies to the transmission and reception point 102#2, too.

Hence, when performing collaboration beamforming from each of the transmission and reception points 102#1 and 102#2 after self-calibration, each of the transmission and reception points 102#1 and 102#2 may determine inter-RRH calibration coefficients $c_{\#1}$ and $c_{\#2}$ by the inter-RRH calibration such that $$c_{\#1} \times (f_{DL}^{(\#1)}/f_{UL}^{(\#1)}) = c_{\#2} \times (f_{DL}^{(\#2)}/f_{UL}^{(\#2)})$$

holds similar to self-calibration.

In this regard, $f_{DL}^{(\#1)}$ represents a channel state from an input of a baseband signal to the precoder 401#1 of the base station 101, to an output of a baseband signal of the receiver 312 of the wireless terminal 103, and $$f_{DL}^{(\#1)} = (W_1^{(\#1)} \times T_1^{(\#1)} \times h_1^{(\#1)} + W_2^{(\#1)} \times T_2^{(\#1)} \times h_2^{(\#1)}) \times r_1 \quad \text{(Formula 5)}$$

can hold. In this regard, $T_1^{(\#1)}$ and $T_2^{(\#1)}$ represent response characteristics of the transmitters 302#1 and 302#2 of the transmission and reception point 102#1, $W_1^{(\#1)}$ and $W_2^{(\#1)}$ represent weights corresponding to the antennas 304#1 and 304#2 of the transmission and reception point 102#1, $h_1^{(\#1)}$ represents a channel state from the antenna 304#1 of the transmission and reception point 102#1 to the antenna 313 of the wireless terminal 103, and $h_1^{(\#1)}$ represents a channel state from the antenna 304#2 of the transmission and reception point 102#1 to the antenna 313 of the wireless terminal 103.

Similarly, $f_{UL}^{(\#1)}$ represents a channel state from an input of a baseband signal to the transmitter 311 of the wireless terminal 103, to an output of a baseband signal of the precoder 401#1 of the base station 101, and $$f_{UL}^{(\#1)} = t_1 \times (h_1^{(\#1)} \times R_1^{(\#1)} \times W_1^{(\#1)} + h_2^{(\#1)} \times R_2^{(\#1)} \times W_2^{(\#1)}) \quad \text{(Formula 6)}$$

can hold. In this regard, $R_1^{(\#1)}$ and $R_2^{(\#1)}$ represent response characteristics of the receivers 303#1 and 303#2 of the transmission and reception point 102#1.

Similarly, $f_{DL}^{(\#2)}$ represents a channel state from an input of a baseband signal to the precoder 401#2 of the base station 101, to an output of a baseband signal of the receiver 312 of the wireless terminal 103, and $$f_{DL}^{(\#2)} = (W_1^{(\#2)} \times T_1^{(\#2)} \times h_1^{(\#2)} + W_2^{(\#2)} \times T_2^{(\#2)} \times h_2^{(\#2)}) \times r_1 \quad \text{(Formula 7)}$$

can hold. In this regard, $T_1^{(\#2)}$ and $T_2^{(\#2)}$ represent response characteristics of the transmitters 302#1 and 302#2 of the transmission and reception point 102#2, $W_1^{(\#2)}$ and $W_2^{(\#2)}$ represent weights corresponding to the antennas 304#1 and 304#2 of the transmission and reception point 102#2, $h_1^{(\#2)}$ represents a channel state from the antenna 304#1 of the transmission and reception point 102#2 to the antenna 313 of the wireless terminal 103, and $h_2^{(\#2)}$ represents a channel state from the antenna 304#2 of the transmission and reception point 102#2 to the antenna 313 of the wireless terminal 103.

Similarly, $f_{UL}^{(\#2)}$ represents a channel state from an input of a baseband signal to the transmitter 311 of the wireless terminal 103, to an output of a baseband signal of the precoder 401#2 of the base station 101, and $$f_{UL}^{(\#2)} = t_1 \times (h_1^{(\#2)} \times R_1^{(\#2)} \times W_1^{(\#2)} \times h_2^{(\#2)} \times R_2^{(\#2)} \times W_2^{(\#2)})$$ (Formula 8)

can hold. In this regard, $R_1^{(\#2)}$ and $R_2^{(\#2)}$ represent response characteristics of the receivers 303#1 and 303#2 of the transmission and reception point 102#2.

More specifically, $c_{\#2}$ and $c_{\#1}$ are determined such that $c_{\#2}/c_{\#1} = (f_{DL}^{(\#1)}/f_{UL}^{(\#1)})/(f_{DL}^{(\#2)}/f_{UL}^{(\#2)})$ holds. Note that, as is clear from calculation performed by substituting (Formula 5) to (Formula 8) in $(f_{DL}^{(\#1)}/f_{DL}^{(\#1)})/(f_{DL}^{(\#2)}/f_{UL}^{(\#2)})$, and taking into account that self-calibration has been finished, $c_{\#2}/c_{\#1}$ does not depend on $t_1$, $r_1$, $h_1^{(\#1)}$, $h_1^{(\#2)}$, $h_2^{(\#1)}$, $h_2^{(\#2)}$, $W_1^{(\#1)}$, $W_1^{(\#2)}$, $W_2^{(\#1)}$ and $W_2^{(\#2)}$.

For example, after self-calibration is finished, equation $T_1^{(\#n)}/R_1^{(\#n)} = T_2^{(\#n)}/R_2^{(\#n)} = k_{\#n}$ holds with respect to a constant Therefore, equation $f_{DL}^{(\#n)}/f_{UL}^{(\#n)} = k_{\#n} \times r_1/t_1$ holds. Consequently, $c_{\#2}/c_{\#1}$ is represented as $k_{\#1}/k_{\#2}$, and does not depend on $t_1$, $r_1$, $h_1^{(\#1)}$, $h_1^{(\#2)}$, $h_2^{(\#1)}$, $h_2^{(\#2)}$, $W_1^{(\#1)}$, $W_1^{(\#2)}$, $W_2^{(\#1)}$ and $W_2^{(\#2)}$.

The inter-RRH calibrator 404 sets the precoders 401#1 and 401#2 to, for example, make correction to multiply 1 on a weight used by the precoder 401#1, and make correction to multiply $c_{\#2}/c_{\#1}$ on a weight used by the precoder 401#2. In other words, when I represents an input to the precoder 401#2, P represents a precoding matrix and O represents an output from the precoder 401#2, the inter-RRH calibrator 404 sets the precoders 401#1 and 401#2 such that $O = (c_{\#2}/c_{\#1}) \times P \times I$ is satisfied.

Figure 5:
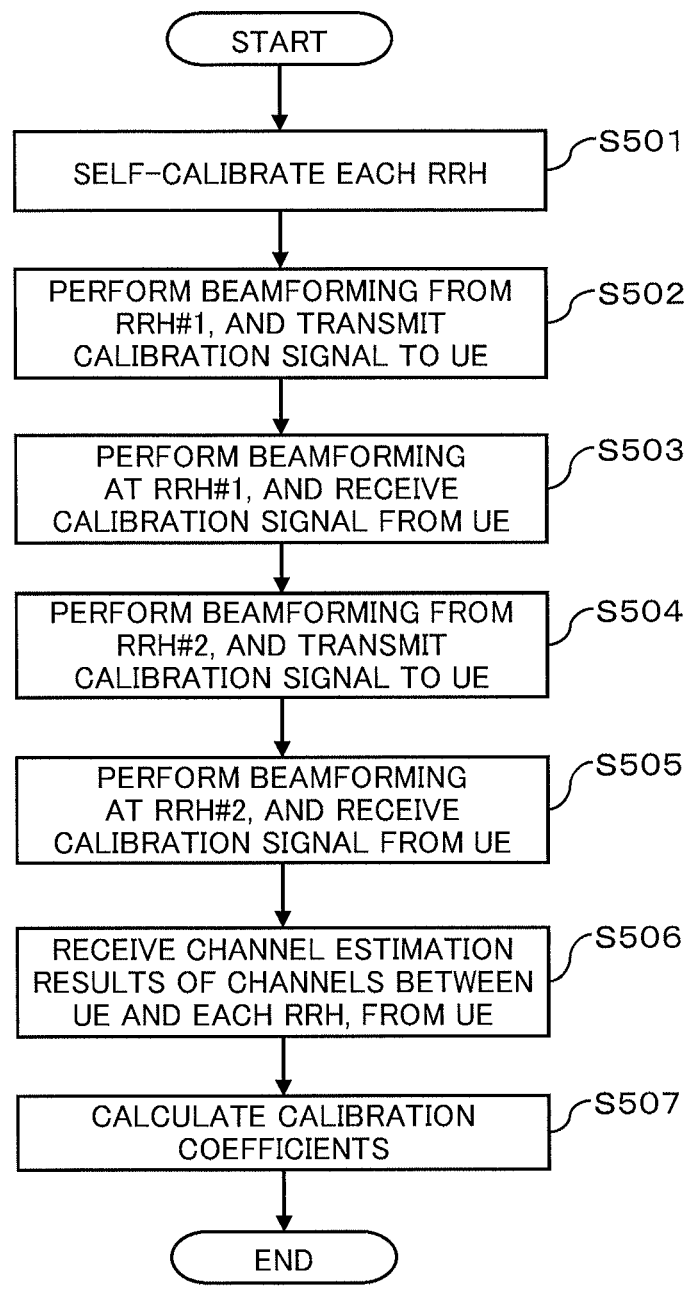
FIG. 5 is a flowchart illustrating a calibration process of the wireless communication system according to the first embodiment.

FIG. 5 is a flowchart for explaining an operation of the base station 101. In step S501, the self-calibrators 403#1 and 403#2 self-calibrate the transmission and reception points 102#1 and 102#2, respectively. The transmission and reception points 102#1 and 102#2 may be self-calibrated in parallel or successively.

Figure 6:
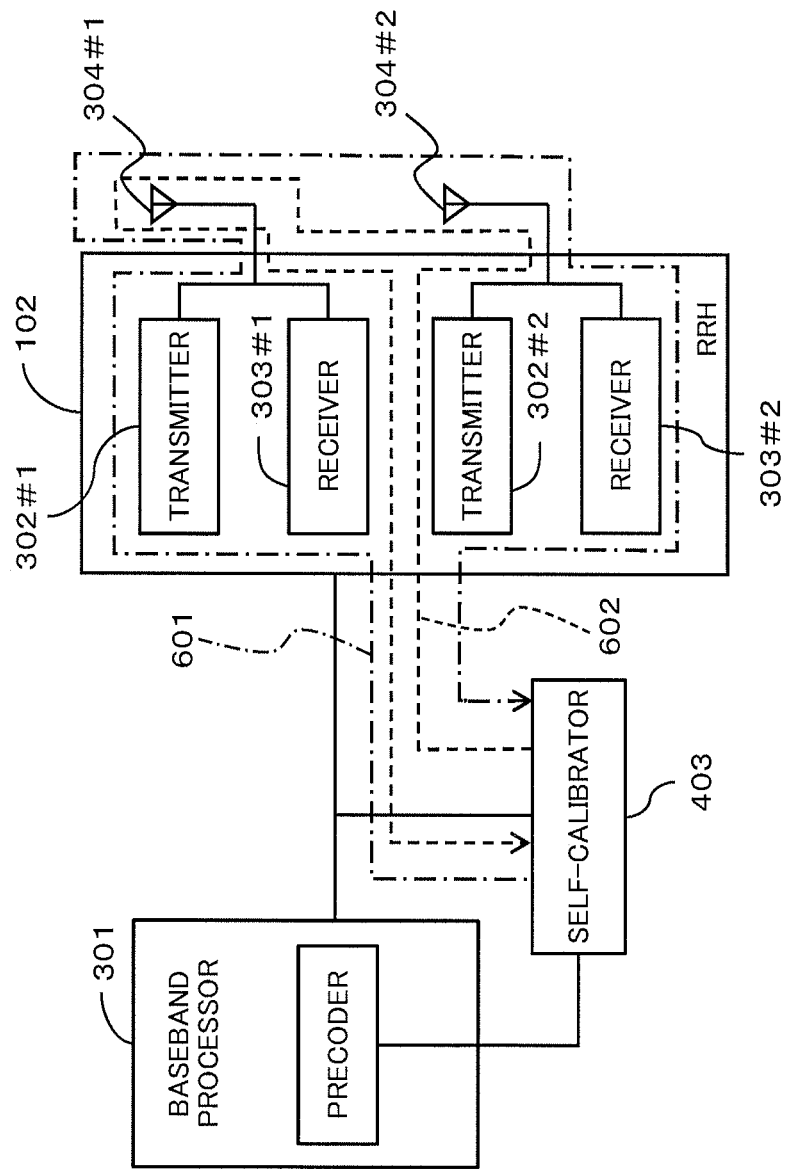
FIG. 6 is a diagram for explaining a self-calibration process of the wireless communication system according to the first embodiment.

FIG. 6 illustrates one of self-calibration processes by the self-calibrator 403. First, as indicated by a dashed-dotted line 601, the transmitter 302#1 transmits a calibration signal, and the receiver 303#2 receives the calibration signal to calculate $T_1 \times H \times R_2$. Next, as indicated by a dotted line 602, the transmitter 302#2 transmits a calibration signal, and the receiver 303#1 receives the calibration signal to calculate $T_2 \times H \times R_1$. H is a channel state between the antennas 304#1 and 304#2. By dividing $T_1 \times H \times R_2$ by $T_2 \times H \times R_1$, $(T_1/R_1)/(T_2/R_2)$ is obtained.

Figure 7:
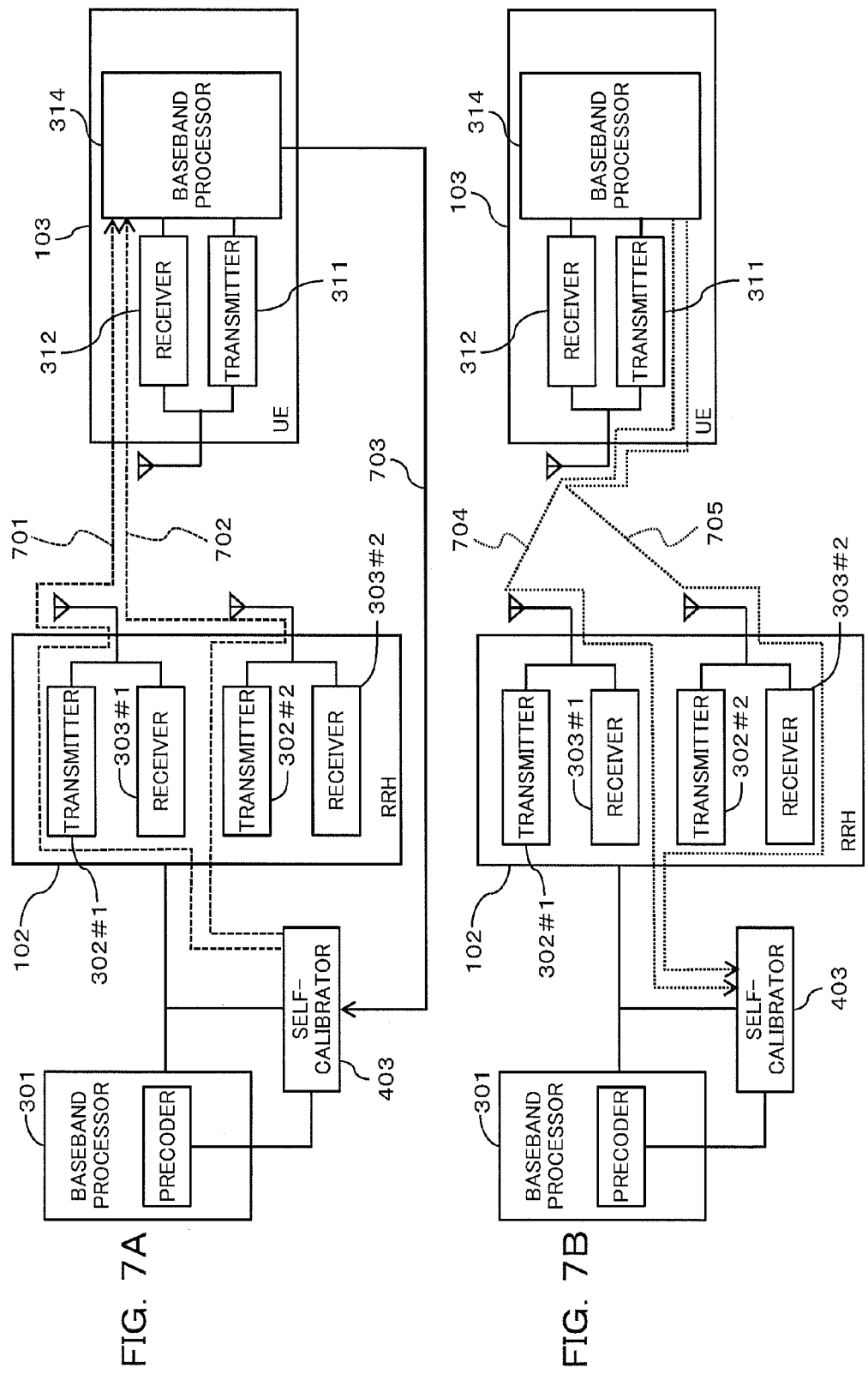
FIG. 7A is a diagram for explaining the self-calibration process of the wireless communication system according to the first embodiment.
FIG. 7B is a diagram for explaining the self-calibration process of the wireless communication system according to the first embodiment.

FIGS. 7A and 7B illustrate one of other self-calibration processes by the self-calibrator 403.

In view of FIG. 7A, the self-calibrator 403 transmits calibration signals to the wireless terminal 103 from the transmitters 302#1 and 302#2 at different timings as indicated by dotted lines 701 and 702. As indicated by a solid line 703, the wireless terminal 103 returns respective channel state estimation results to the self-calibrator 403. The respective channel state estimation results are $T_1 \times h_1 \times r_1$ and $T_2 \times h_2 \times r_1$.

Next, in view of FIG. 7B, the wireless terminal 103 transmits calibration signals to the transmission and reception point 102 as indicated by dotted lines 704 and 705. The self-calibrator 403 receives the calibration signals via the receivers 303#1 and 303#2 to estimate a channel state. Respective channel state estimation results are $t_1 \times h_1 \times R_1$ and $t_1 \times h_2 \times R_2$.

The self-calibrator 403 calculates $(T_1 \times r_1)/(t_1 \times R_1)$ according to $(T_1 \times h_1 \times r_1)/(t_1 \times h_1 \times R_1)$. Further, the self-calibrator 403 calculates $(T_2 \times r_1)/(t_1 \times R_2)$ according to $(T_2 \times h_2 \times r_1)/(t_1 \times h_2 \times R_2)$. Next, the self-calibrator 403 calculates $((T_1 \times r_1)/(t_1 \times R_1))/((T_2 \times r_1)/(t_1 \times R_2)) = (T_1/R_1)/(T_2/R_2)$.

Back to explanation of the flowchart in FIG. 5, in step S502, the inter-RRH calibrator 404 performs transmission beamforming from the transmission and reception point 102#1 to transmit a calibration signal to the wireless terminal 103. In step S503, the inter-RRH calibrator 404 performs reception beamforming at the transmission and reception point 102#1 to receive the calibration signal from the wireless terminal 103. In addition, during transmission beamforming and reception beamforming, the same weight is multiplexed on a baseband signal. In step S502, $f_{DL}^{(1)}$ as a DL channel estimation result by the wireless terminal 103. Further, in step S503, $f_{UL}^{(1)}$ is obtained as an UL channel estimation result by the baseband processor 301#1.

In step S504, the inter-RRH calibrator 404 performs transmission beamforming from the transmission and reception point 102#2 to transmit a calibration signal to the wireless terminal 103. In step S505, the inter-RRH calibrator 404 performs reception beamforming at the transmission and reception point 102#2 to receive the calibration signal from the wireless terminal 103. Similar to steps S502 and S503, during the transmission beamforming and the reception beamforming, the same weight is multiplied on a baseband signal. In step S504, $f_{DL}^{(2)}$ is obtained as a DL channel estimation result by the wireless terminal 103. Further, in step S505, $f_{UL}^{(2)}$ is obtained as an UL channel estimation result by the baseband processor 301#2.

In step S506, the inter-RRH calibrator 404 receives $f_{DL}^{(1)}$ and $f_{DL}^{(2)}$ from the wireless terminal 103. In step S507, the inter-RRH calibrator 404 calculates inter-RRH calibration coefficients.

In addition, the processes in S502 to S505 do not need to be executed according to the order illustrated in FIG. 5, and may be executed in arbitrary order. Further, in step S506, the inter-RRH calibrator 404 receives $f_{DL}^{(1)}$ and $f_{DL}^{(2)}$ from the wireless terminal 103, and step S506 is not limited to this. For example, after the process in step S502, the inter-RRH calibrator 404 may receive $f_{DL}^{(1)}$ from the wireless terminal 103, and, after the process in step S504, the inter-RRH calibrator 404 may receive $f_{DL}^{(2)}$ from the wireless terminal 103. Further, it is also possible to simultaneously perform steps S503 and S505.

Figure 8:
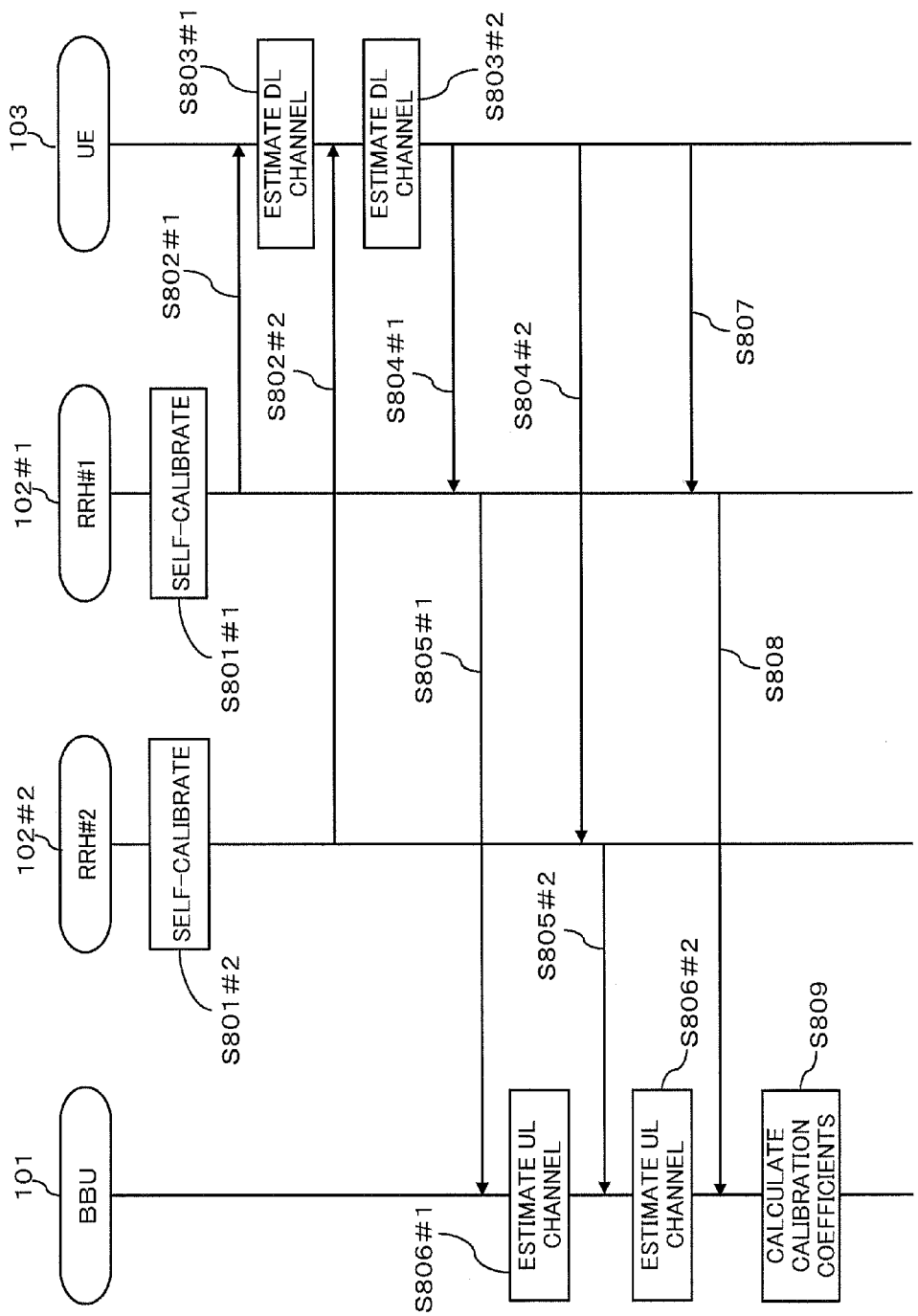
FIG. 8 is a sequence diagram of the calibration process of the wireless communication system according to the first embodiment.

FIG. 8 is a sequence diagram of a calibration process performed by the base station 101, the transmission and reception points 102#1 and 102#2 and the wireless terminal 103.

In steps S801#1 and S801#2, the transmission and reception points 102#1 and 102#2 perform self-calibration. Steps S801#1 and S801#2 may correspond to step S501.

In step S802#1, the transmission and reception point 102#1 transmits a calibration signal to the wireless terminal 103, and, in step S803#1, the wireless terminal 103 obtains $f_{DL}^{(1)}$ as an estimation result by performing DL channel estimation. Steps S802#1 and S803#1 may correspond to step S502.

In step S802#2, the transmission and reception point 102#2 transmits a calibration signal to the wireless terminal 103, and, in step S803#2, the wireless terminal 103 calculates $f_{DL}^{(2)}$ by performing DL channel estimation. Steps S802#2 and S803#2 may correspond to step S504.

In step S804#1, the wireless terminal 103 transmits a calibration signal to the transmission and reception point 102#1. The calibration signal received at the transmission and reception point 102#1 is converted into a baseband signal, and the converted baseband signal is outputted to the baseband processor 301#1 in step S805#1. In step S806#1, UL channel estimation is performed, and $f_{UL}^{(1)}$ is obtained as an estimation result. Steps S804#1 and S805#1 may correspond to step S503.

In step S804#2, the wireless terminal 103 transmits a calibration signal to the transmission and reception point 102#2. The calibration signal received at the transmission and reception point 102#2 is converted into a baseband signal, and the converted baseband signal is outputted to the baseband processor 301#2 in step S805#2. In step S806#2, UL channel estimation is performed, and $f_{UL}^{(2)}$ is calculated. Steps S804#2 and S805#2 may correspond to step S505.

In step S807, $f_{DL}^{(1)}$ and $f_{DL}^{(2)}$ which are DL channel estimation results are transmitted to the transmission and reception point 102#1, for example. $f_{DL}^{(1)}$ and $f_{DL}^{(2)}$ may be transmitted to the transmission and reception point 102#2 instead of being transmitted to the transmission and reception point 102#1. Further, $f_{DL}^{(1)}$ and $f_{DL}^{(2)}$ may be transmitted to a third wireless facility which can communicate with the base station 101. For example, $f_{DL}^{(1)}$ and $f_{DL}^{(2)}$ transmitted to the transmission and reception point 102#1 are transmitted to the base station 101 in step S808. Steps S807 and S808 may correspond to step S506.

When the processes up to step S808 are finished, $f_{UL}^{(1)}$, $f_{UL}^{(2)}$, $f_{DL}^{(1)}$ and $f_{DL}^{(2)}$ are outputted to the inter-RRH calibrator 404 of the base station 101. In step S809, the inter-RRH calibration coefficients are calculated, are set to, for example, the precoders 401#1 and 402#2, and are multiplied on a precoding matrix. Step S809 may correspond to step S507.

Figure 9:
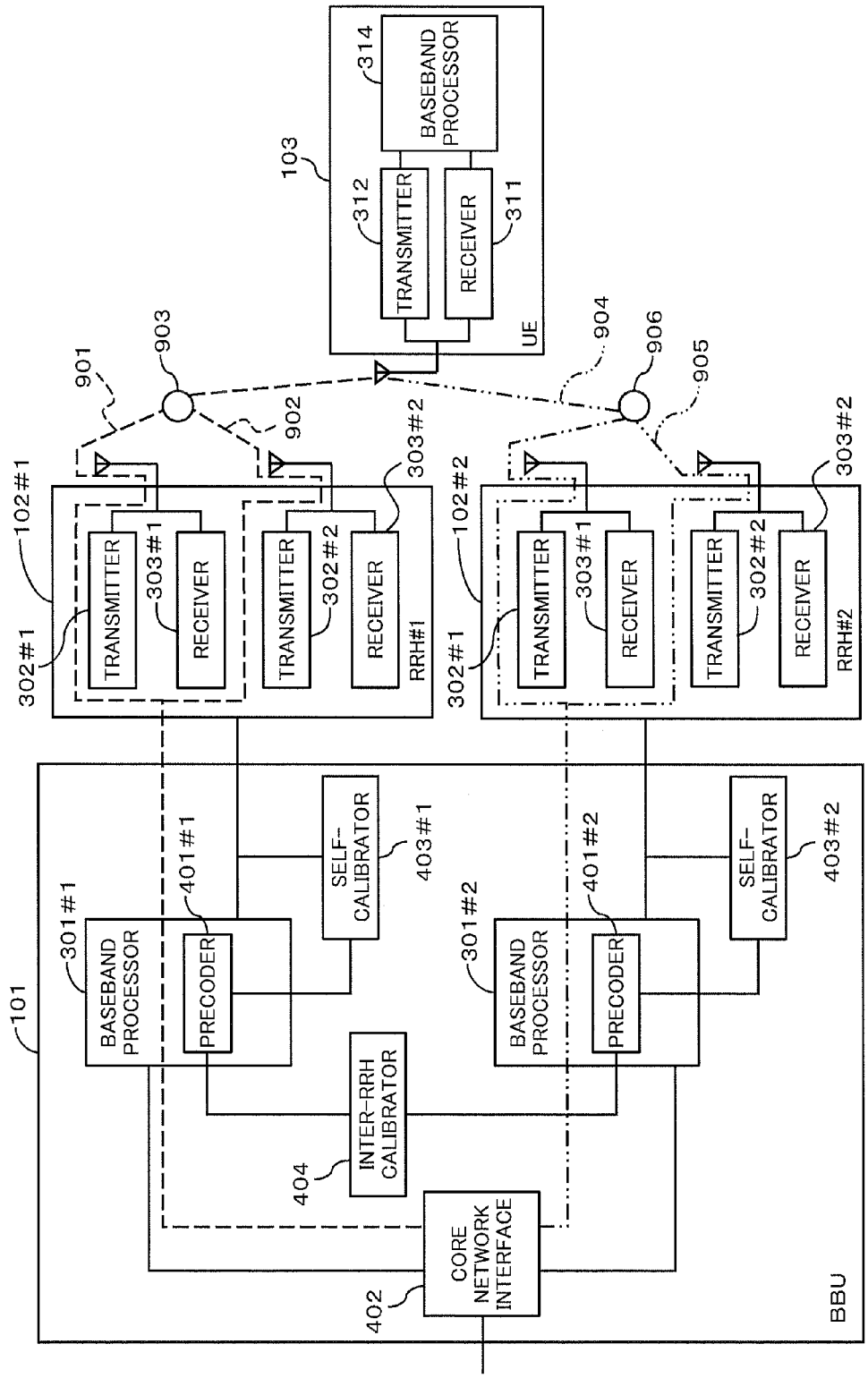
FIG. 9 is a diagram for explaining calibration performed by the wireless communication system according to the first embodiment.
Figure 10:
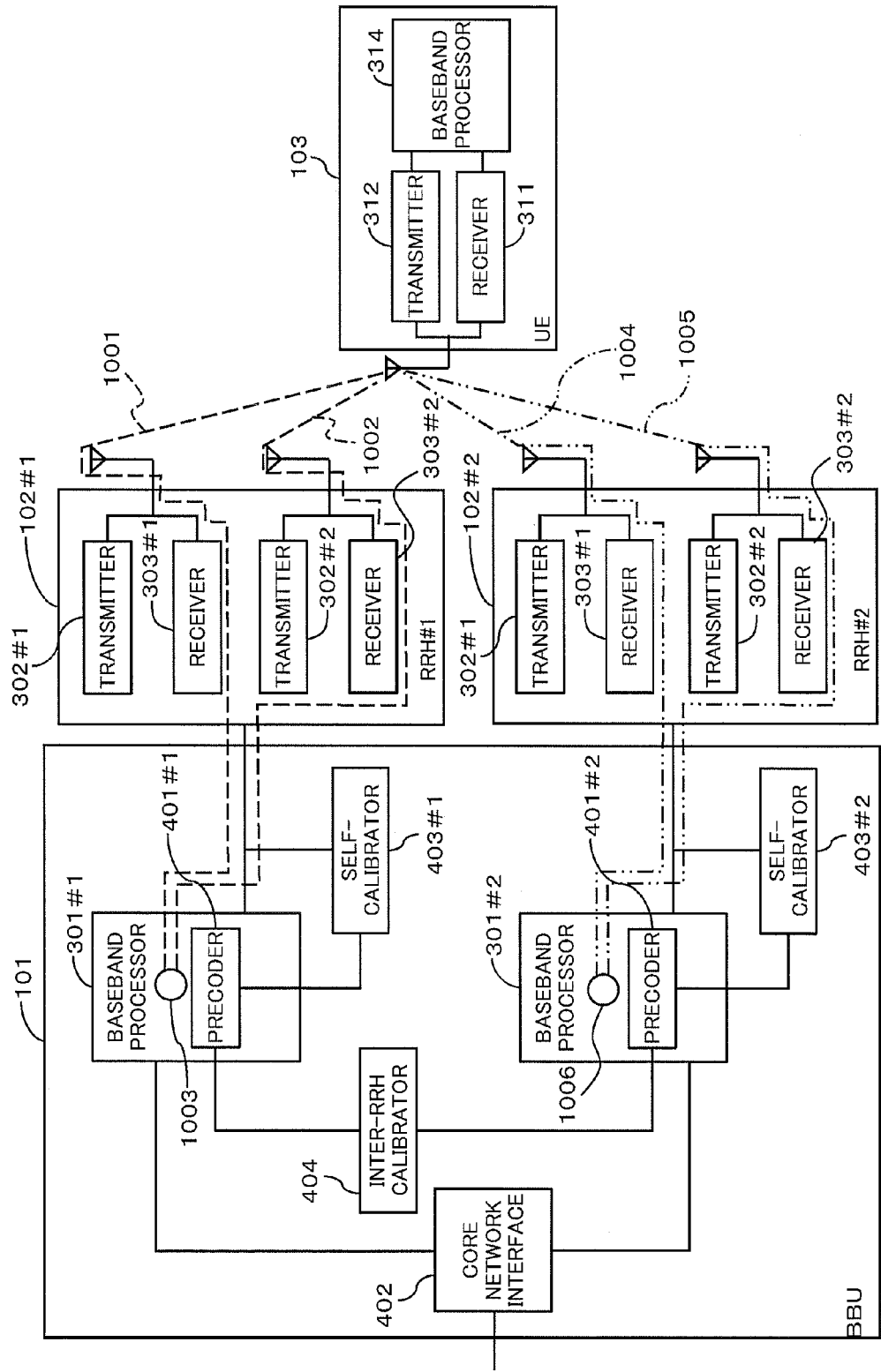
FIG. 10 is a diagram for explaining calibration performed by the wireless communication system according to the first embodiment.

FIGS. 9 and 10 are diagrams for explaining another aspect of an operation of the inter-RRH calibrator 404. First, in view of FIG. 9, as indicated by dotted lines 901 and 902, the inter-RRH calibrator 404 performs transmission by way of beamforming from the baseband processor 301#1 to transmit a calibration signal to the wireless terminal 103. In this case, as indicated by reference numeral 903, a gain is produced by beamforming. Consequently, the wireless terminal 103 can receive a calibration signal of a higher power, and more accurately estimate a channel state.

Similarly, as indicated by dashed-two dotted lines 904 and 905, the inter-RRH calibrator 404 performs transmission by way of beamforming from the baseband processor 301#2, and transmits a calibration signal to the wireless terminal 103. In this case, as indicated by, reference numeral 906, a gain is produced by beamforming. Consequently, the wireless terminal 103 can receive a calibration signal of a higher power, and more accurately estimate a channel state.

Next, in view of FIG. 10, the wireless terminal 103 transmits calibration signals to the transmission and reception points 102#1 and 102#2. When the baseband processor 301#1 performs reception by way of beamforming to receive calibration signals 1001 and 1002, a gain is produced by beamforming (see reference numeral 1003 in FIG. 10). Consequently, even when transmission power of the wireless terminal 103 is not high, the baseband processor 301#1 can obtain sufficient reception power for channel estimation.

Similarly, when the baseband processor 301#2 performs reception by way of beamforming to receive calibration signals 1004 and 1005, a gain is produced by beamforming (see reference numeral 1006 in FIG. 10). Consequently, even when transmission power of the wireless terminal 103 is not high, the baseband processor 301#2 can obtain sufficient reception power for channel estimation.

As described above, according to the present embodiment, beamforming is performed to perform inter-RRH calibration. Consequently, even when each transmission and reception point includes a plurality of transmitters and receivers, it is possible to perform inter-RRH calibration in a short time compared to a case where the individual transmitters and receivers perform calibration. Further, self-calibration is performed and then beamforming is performed, so that it is possible to transmit and receive a calibration signal of sufficiently high reception power and more accurately perform inter-RRH calibration.

Figure 11:
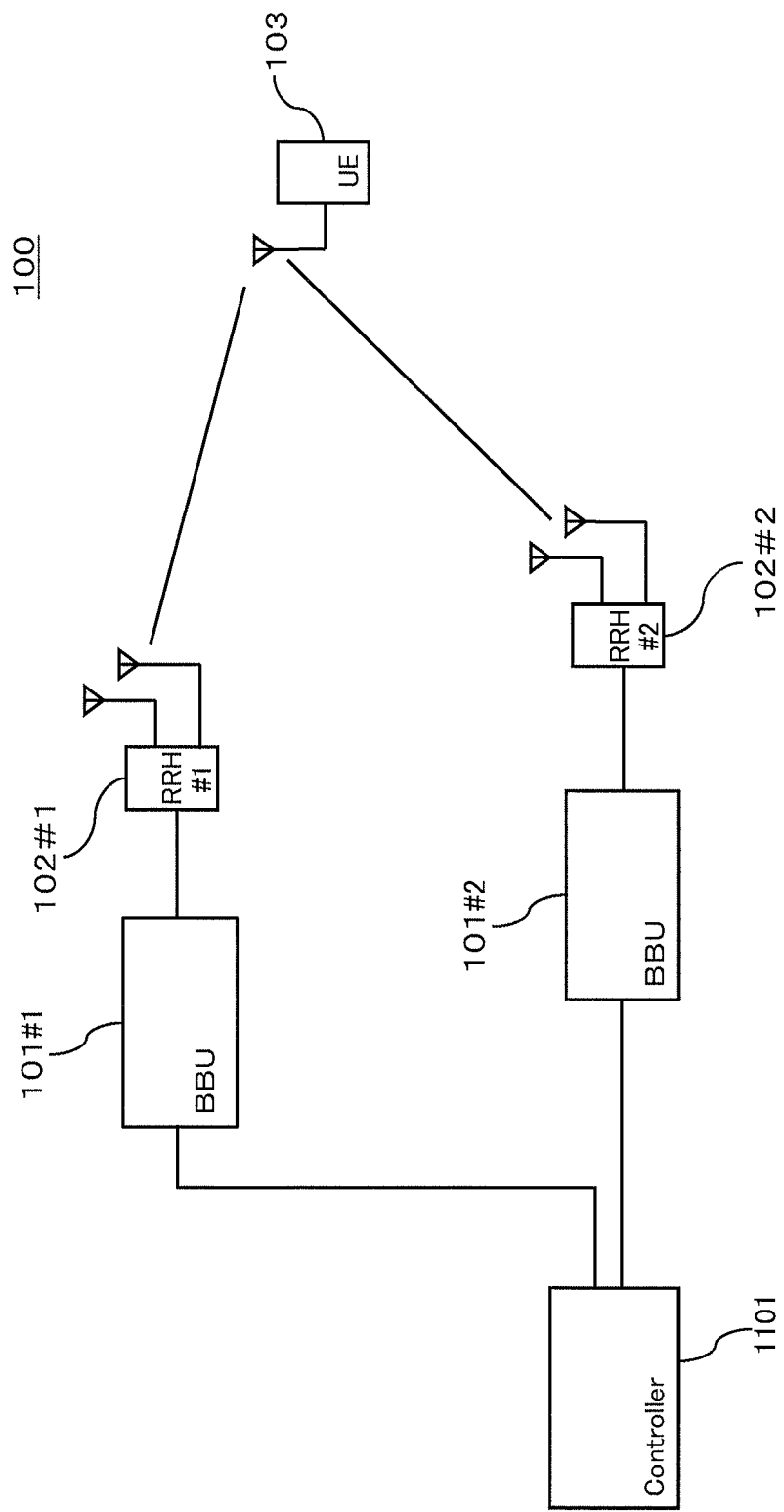
FIG. 11 is another entire diagram of the wireless communication system according to the first embodiment.

In addition, the above description assumes that the transmission and reception points 102#1 and 102#2 are controlled by the same base station 101. However, the present embodiment is not limited to this assumption and, as illustrated in FIG. 11, for example, each of the transmission and reception points 102#1 and 102#2 may be controlled by the different base stations 101#1 and 101#2, respectively. In this case, the inter-RRH calibrator 404 can be provided to an upper base station 1101 of the base stations 101#1 and 101#2.

In addition, when the number of transmission and reception points is N (N is an integer equal to or more than 2), an integer n which is 2 or more and N or less is $$c_{\#n}/c_{\#1}=(f_{DL}^{(\#1)}/f_{UL}^{(\#1)})/(f_{DL}^{(\#n)}/f_{UL}^{(\#n)}),$$

so that the inter-RRH calibrator 404 can calculate calibration coefficients related to a transmission and reception point 102#n. Note that, coefficients 1, $c_{\#2}/c_{\#1}$, $c_{\#3}/c_{\#1}$, . . . , and $c_{\#n}/c_{\#1}$ are examples of calibration coefficients $c^{(1)}$, $c^{(2)}$, $c^{(3)}$, . . . , and $c^{(N)}$.

Second Embodiment

A mode that inter-RRH calibration is performed between transmission and reception points without using a wireless terminal 103 will be described in a second embodiment.

Figure 12:
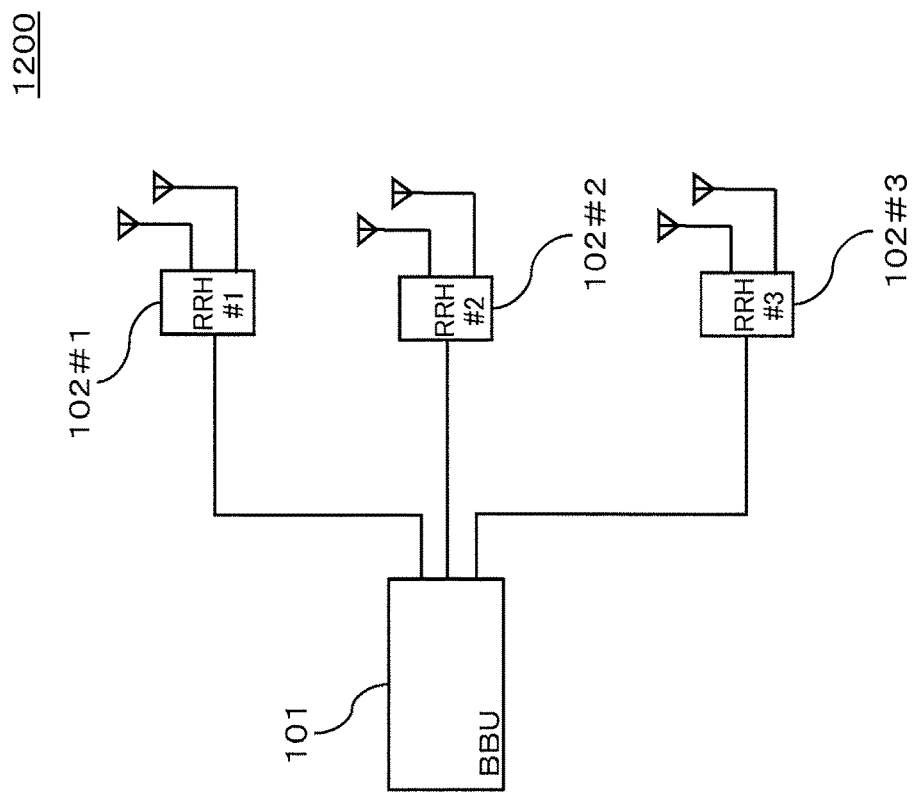
FIG. 12 is an entire diagram of a wireless communication system according to a second embodiment.

FIG. 12 is an entire diagram of a wireless communication system according to the second embodiment. As illustrated in FIG. 12, a wireless communication system 1200 includes the base station 101 and the transmission and reception points 102#1, 102#2 and 102#3. In addition, the number of transmission and reception points 102 is not limited to 3 and needs to be 2 or more.

Similar to the first embodiment, in the present embodiment, each transmission and reception point 102 performs self-calibration, and beamforming is performed in inter-RRH calibration. The second embodiment differs from the first embodiment in: first, performing inter-RRH calibration between the transmission and reception point 102#1 and the transmission and reception point 102#2; next, performing inter-RRH calibration between the transmission and reception point 102#2 and the transmission and reception point 102#3; and further, performing inter-RRH calibration between the transmission and reception points 102#1 to 102#3 by using each inter-RRH calibration result.

Figure 13:
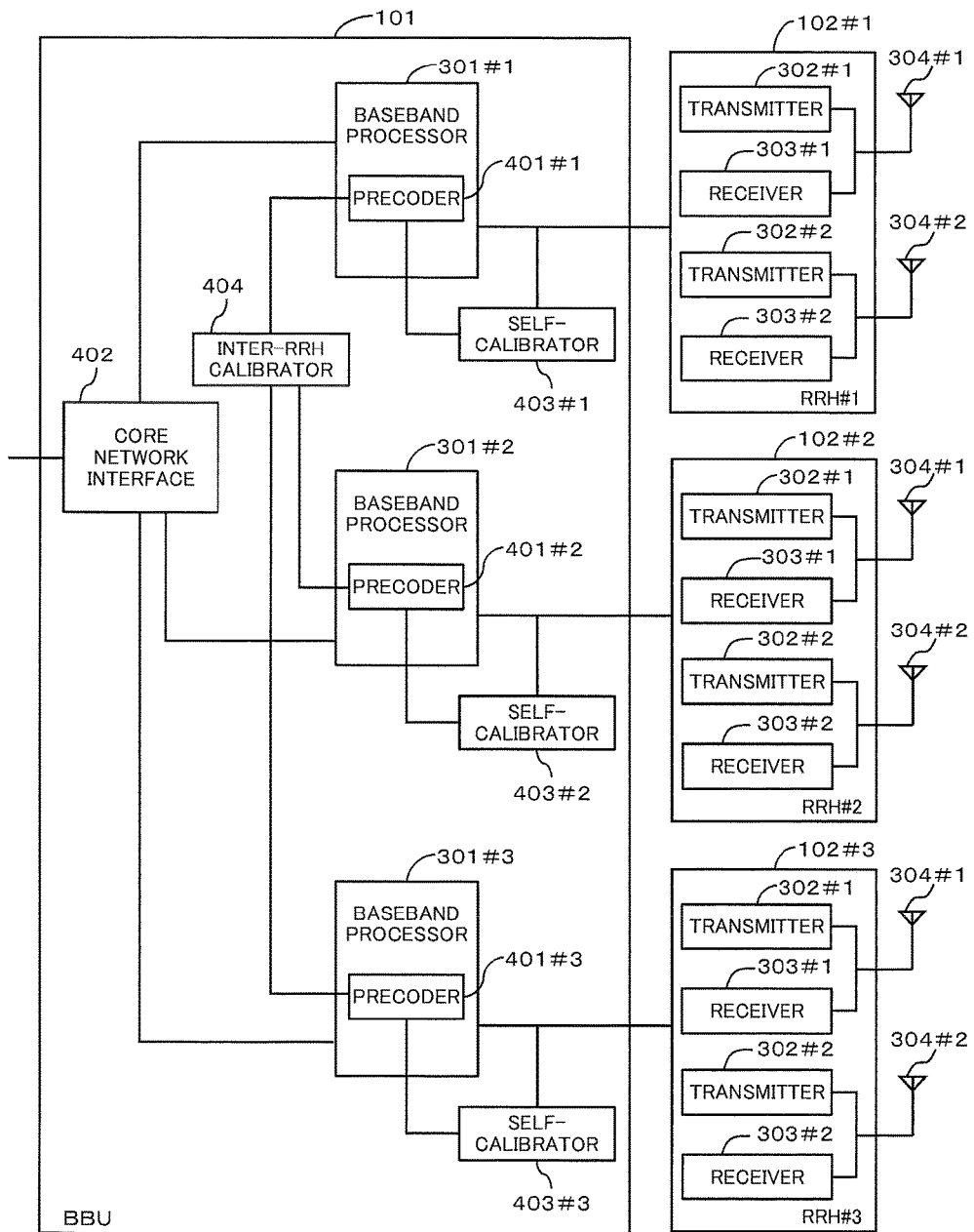
FIG. 13 is a functional block diagram of the wireless communication system according to the second embodiment.

FIG. 13 is a functional block diagram of the base station 101 and the transmission and reception points 102 according to the present embodiment. The present embodiment is the same as the first embodiment except for that the number of transmission and reception points 102, the number of self-calibrators 403 and the number of baseband processors 301 increase to 3. In this regard, the present embodiment differs from the first embodiment in an operation of the inter-RRH calibrator 404.

Figure 14:
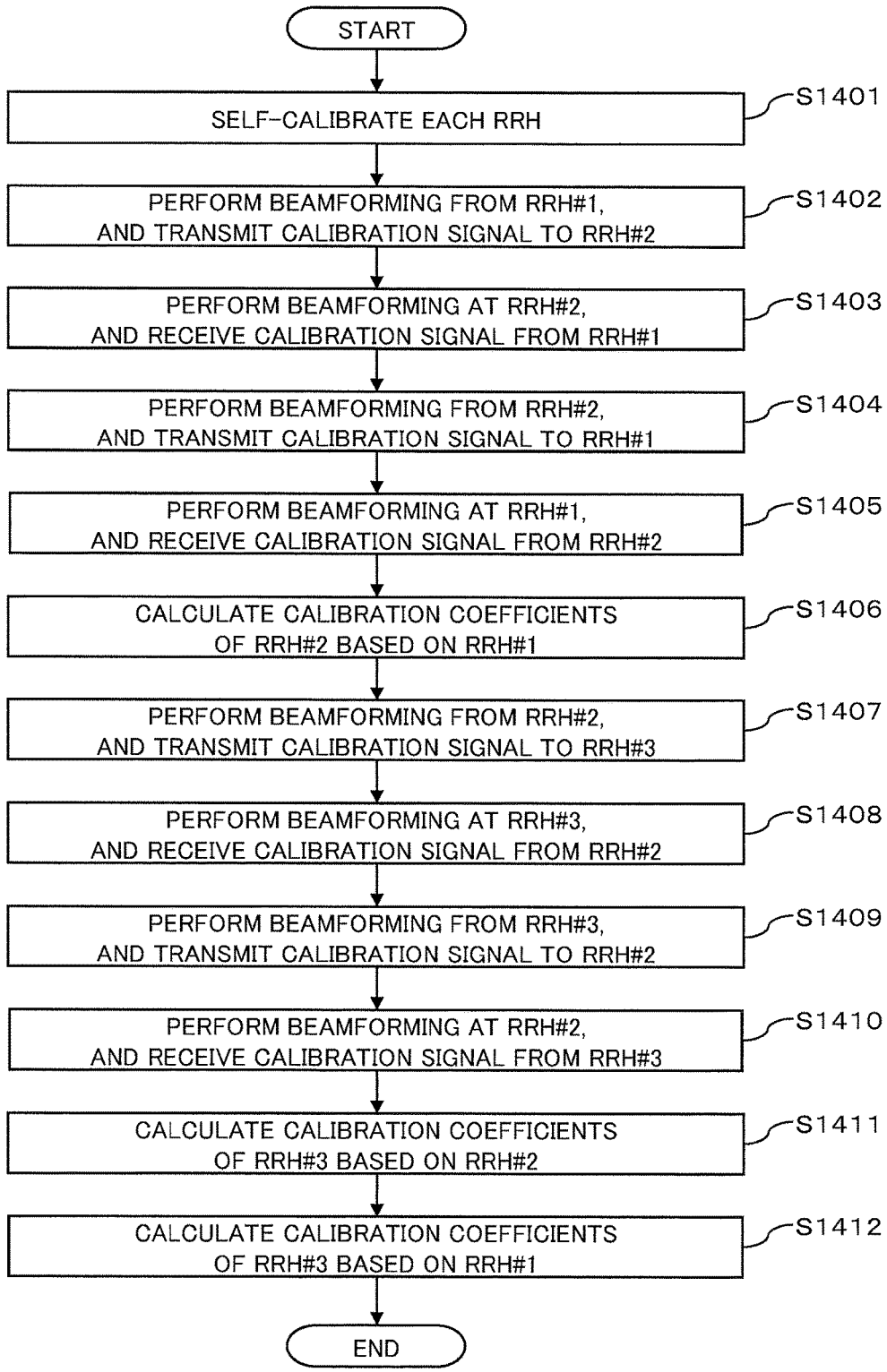
FIG. 14 is a flowchart of a calibration process according to the second embodiment.

FIG. 14 is a flowchart for explaining a calibration process according to the present embodiment.

In step S1401, each transmission and reception point 102 performs self-calibration. Self-calibration may be performed in parallel or successively.

In step S1402, the inter-RRH calibrator 404 performs beamforming from the transmission and reception point 102#1 to the transmission and reception point 102#2 to transmit a calibration signal. In step S1403, the transmission and reception point 102#2 performs beamforming to receive a calibration signal from the transmission and reception point 102#1.

In steps S1402 and S1403, $T_1^{(1)} \times h_{12} \times R_1^{(2)}$ is estimated by a baseband processor 301#2, and is obtained by the inter-RRH calibrator 404. In this regard, $T_1^{(1)}$ represents response characteristics of a transmitter 302#1 of the transmission and reception point 102#1, $h_{12}$ represents a channel state between the transmission and reception point 102#1 and the transmission and reception point 102#2, and $R_1^{(2)}$ represents response characteristics of a receiver 303#1 of the transmission and reception point 102#2.

Next, in step S1404, the inter-RRH calibrator 404 performs beamforming from the transmission and reception point 102#2 to the transmission and reception point 102#1 to transmit a calibration signal. In step S1405, the transmission and reception point 102#1 performs beamforming to receive a calibration signal from the transmission and reception point 102#2.

In steps S1404 and S1405, $T_1^{(2)} \times h_{12} \times R_1^{(1)}$ is estimated by a baseband processor 301#1, and is obtained by the inter-RRH calibrator 404. In this regard, $T_1^{(2)}$ represents response characteristics of the transmitter 302#1 of the transmission and reception point 102#2, and $R_1^{(1)}$ represents response characteristics of a receiver 303#1 of the transmission and reception point 102#1.

Next, in step S1406, the inter-RRH calibrator 404 calculates a calibration coefficient $c_{\#2}/c_{\#1}$ of the transmission and reception point 102#2 based on the transmission and reception point 102#1 according to $(T_1^{(1)} \times h_{12} \times R_1^{(2)})/(T_1^{(2)} \times h_{12} \times R_1^{(1)})$. $c_{\#2}/c_{\#1}$ is equal to $(T_1^{(1)} \times h_{12} \times R_1^{(2)})/(T_1^{(2)} \times h_{12} \times R_1^{(1)})$ as follows.

$$(T_1^{(1)} \times h_{12} \times R_1^{(2)})/(T_1^{(2)} \times h_{12} \times R_1^{(1)}) = (T_1^{(1)} \times R_1^{(2)})/(T_1^{(2)} \times R_1^{(1)})$$
$$= (T_1^{(1)}/R_1^{(1)})/(T_1^{(2)}/R_1^{(2)})$$
$$= c_{\#2}/c_{\#1}$$

Next, in step S1407, the inter-RRH calibrator 404 performs beamforming from the transmission and reception point 102#2 to the transmission and reception point 102#3 to transmit a calibration signal. In step S1408, the transmission and reception point 102#3 performs beamforming to receive a calibration signal from the transmission and reception point 102#2.

In steps S1407 and S1408, $T_1^{(2)} \times h_{23} \times R_1^{(3)}$ is estimated by a baseband processor 301#3, and is obtained by the inter-RRH calibrator 404. In this regard, $h_{23}$ represents a channel state between the transmission and reception point 102#2 and the transmission and reception point 102#3, and $R_1^{(3)}$ represents response characteristics of the receiver 303#1 of the transmission and reception point 102#3.

Next, in step S1409, the inter-RRH calibrator 404 performs beamforming from the transmission and reception point 102#3 to the transmission and reception point 102#2 to transmit a calibration signal. In step S1410, the transmission and reception point 102#2 performs beamforming to receive a calibration signal from the transmission and reception point 102#3.

In steps S1409 and S1410, $T_1^{(3)} \times h_{23} \times R_1^{(2)}$ is estimated by the baseband processor 301#2, and is obtained by the inter-RRH calibrator 404. In this regard, $T_1^{(3)}$ represents response characteristics of the transmitter 302#1 of the transmission and reception point 102#3.

Next, in step S1411, the inter-RRH calibrator 404 calculates a calibration coefficient $c_{\#3}/c_{\#2}$ of the transmission and reception point 102#3 based on the transmission and reception point 102#2 according to $(T_1^{(2)} \times h_{12} \times R_1^{(3)})/(T_1^{(3)} \times h_{12} \times R_1^{(2)})$. That is equal to $(T_1^{(2)} \times h_{12} \times R_1^{(3)})/(T_1^{(3)} \times_{12} \times R_1^{(2)})$ is the same as that described with reference to step S1406.

Next, in step S1412, the inter-RRH calibrator 404 calculates a calibration coefficient $c_{\#3}/c_{\#1}$ of the transmission and reception point 102#3 based on the transmission and reception point 102#1 according to $(c_{\#3}/c_{\#2}) \times (c_{\#2}/c_{\#1})$.

In addition, execution of each step of calibration is not limited to an order illustrated in the flowchart in FIG. 14. For example, before the process in step S1406, steps S1402, S1403, S1404 and S1405 may be executed in arbitrary order. Further, before the process in step S1411, steps S1407 and S1408, and steps S1409 and S1410 may be executed in arbitrary order. Furthermore, step S1411 may be executed before step S1406.

Figure 15:
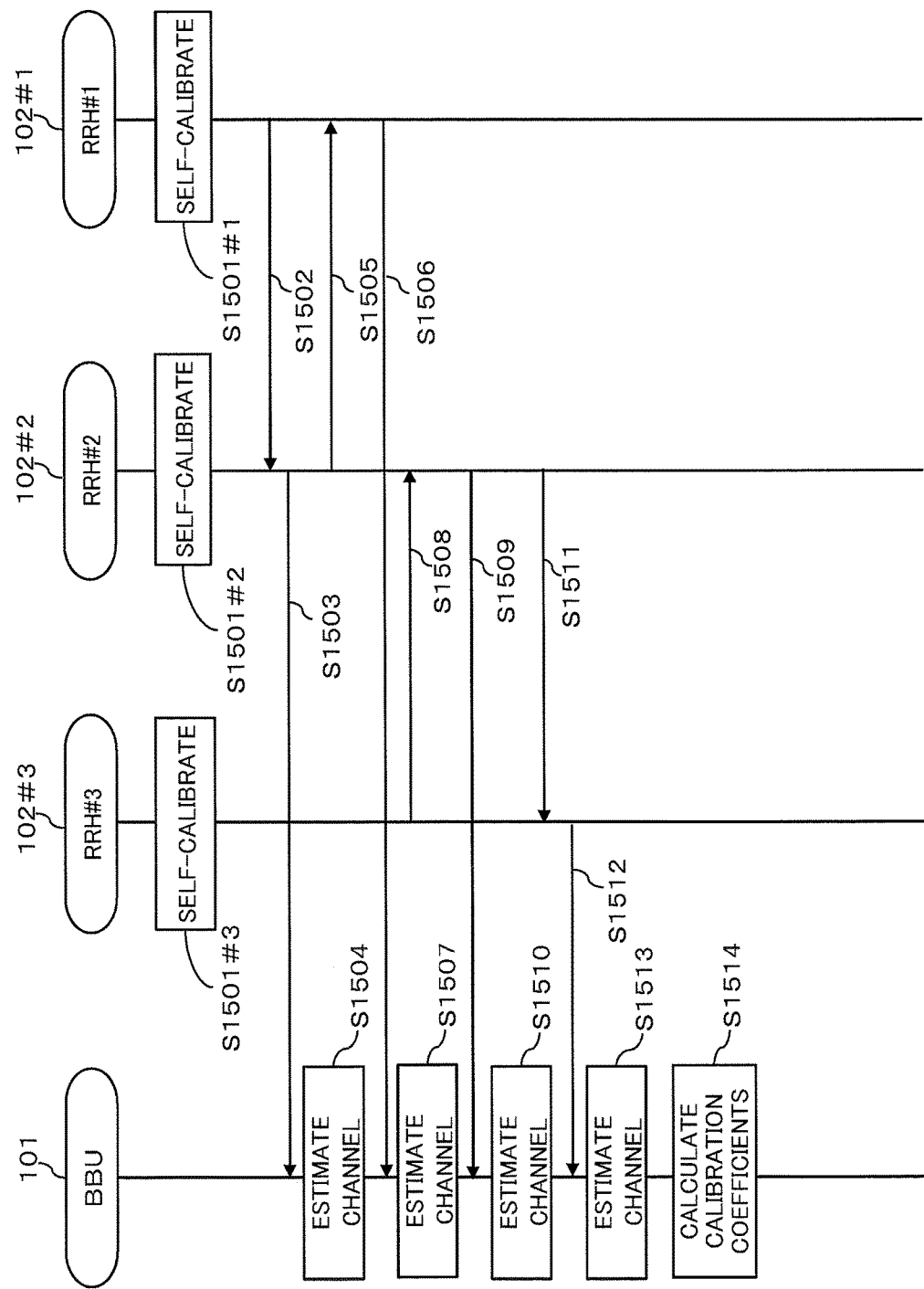
FIG. 15 is a sequence diagram of the calibration process according to the second embodiment.

FIG. 15 is a sequence diagram of a calibration process performed by the base station 101 and the transmission and reception points 102#1 to 102#3.

In steps S1501#1, S1501#2 and S1501#3, the transmission and reception points 102#1 to 102#3 perform self-calibration. Steps S1501#1, S1501#2 and S1501#3 may correspond to step S1401.

In step S1502, beamforming is performed from the transmission and reception point 102#1 to transmit a calibration signal to the transmission and reception point 102#2. Further, the transmission and reception point 102#2 performs beamforming to receive the calibration signal from the transmission and reception point 102#1. In step S1503, the transmission and reception point 102#2 transmits a baseband signal corresponding to the received calibration signal to the baseband processor 301#2 of the base station 101. In step S1504, the baseband processor 301#2 performs channel estimation. Steps S1502 to S1504 may correspond to steps S1402 and S1403.

In step S1505, beamforming is performed from the transmission and reception point 102#2 to transmit a calibration signal to the transmission and reception point 102#1. Further, the transmission and reception point 102#1 performs beamforming to receive the calibration signal from the transmission and reception point 102#2. In step S1506, the transmission and reception point 102#1 transmits a baseband signal corresponding to the received calibration signal to the baseband processor 301#1 of the base station 101. In step S1507, the baseband processor 301#1 performs channel estimation. Steps S1505 to S1507 may correspond to steps S1404 and S1405.

In step S1508, beamforming is performed from the transmission and reception point 102#3 to transmit a calibration signal to the transmission and reception point 102#2. Further, the transmission and reception point 102#2 performs beamforming to receive the calibration signal from the transmission and reception point 102#3. In step S1509, the transmission and reception point 102#2 transmits a baseband signal corresponding to the received calibration signal to the baseband processor 301#2 of the base station 101, and, in step S1510, the baseband processor 301#2 performs channel estimation. Steps S1508 to S1510 may correspond to steps S1409 and S1410.

In step S1511, beamforming is performed from the transmission and reception point 102#2 to transmit a calibration signal to the transmission and reception point 102#3. Further, the transmission and reception point 102#3 performs beamforming to receive the calibration signal from the transmission and reception point 102#2. In step S1512, the transmission and reception point 102#3 transmits a baseband signal corresponding to a received calibration signal to the baseband processor 301#3, and, in step S1513, the baseband processor 301#3 performs channel estimation. Steps S1511 to S1513 may correspond to steps S1407 and S1408.

In step S1514, calibration coefficients are calculated. Step S1514 may correspond to steps S1406, S1411 and S1412.

As described above, according to the present embodiment, it is possible to perform inter-RRH calibration by using transmission and reception points, and a wireless terminal does not need to be used unlike the first embodiment. Further, positions of transmission and reception points are normally are fixed, so that it is possible to perform more accurate beamforming compared to a case where a movable wireless terminal is used, and more accurately perform calibration.

In addition, when the number of transmission and reception points is N (N is an integer equal to or more than 2), an integer n equal to or more than 2 and equal to or less than N is $$c_{\#n}/c_{\#n-1}=(T_1^{(n-1)} \times h_{n-1,n} \times R_1^{(n)})/(T_1^{(n)} \times n_{n-1,n} \times R_1^{(n-1)}),$$

and the inter-RRH calibrator 404 calculates calibration coefficients according to $$c_{\#n}/c_{\#1}=(c_{\#n}/c_{\#n-1}) \times (c_{\#n-1}/c_{\#n-2}) \times \ldots \times (c_{\#2}/c_{\#1}).$$

Note that $c_{\#2}/c_{\#1}$, $c_{\#3}/c_{\#2}$, ..., $c_{\#n-1}/c_{\#n-2}$, $c_{\#n}/c_{\#n-1}$ does not need to be calculated in this order. For example, by calculating $c_{\#2}/c_{\#1}$ and $c_{\#n}c_{\#n-1}$ in parallel, and then calculating $c_{\#3}/c_{\#2}$ and $c_{\#n-1}/c_{\#n-2}$ in parallel, it is possible to reduce a time take to perform inter-RRH calibration. Coefficients 1, $c_{\#2}/c_{\#1}$, $c_{\#3}/c_{\#2}$, ..., $c_{\#n-1}/c_{\#n-2}$, and $c_{\#n}/c_{\#n-1}$ are examples of coefficients $d^{(1)}$, $d^{(1)}$, $d^{(2)}$, $d^{(3)}$, ..., $d^{(N-1)}$, and $d^{(N)}$. Coefficient $c^{(N)}$ may be calculated as $c^{(N)}=d^{(N)} \times d^{(N-1)} \times \ldots \times d^{(1)}$.

Third Embodiment

Inter-RRH calibration which is a combination of the first embodiment and the second embodiment will be described in a third embodiment.

Figure 16:
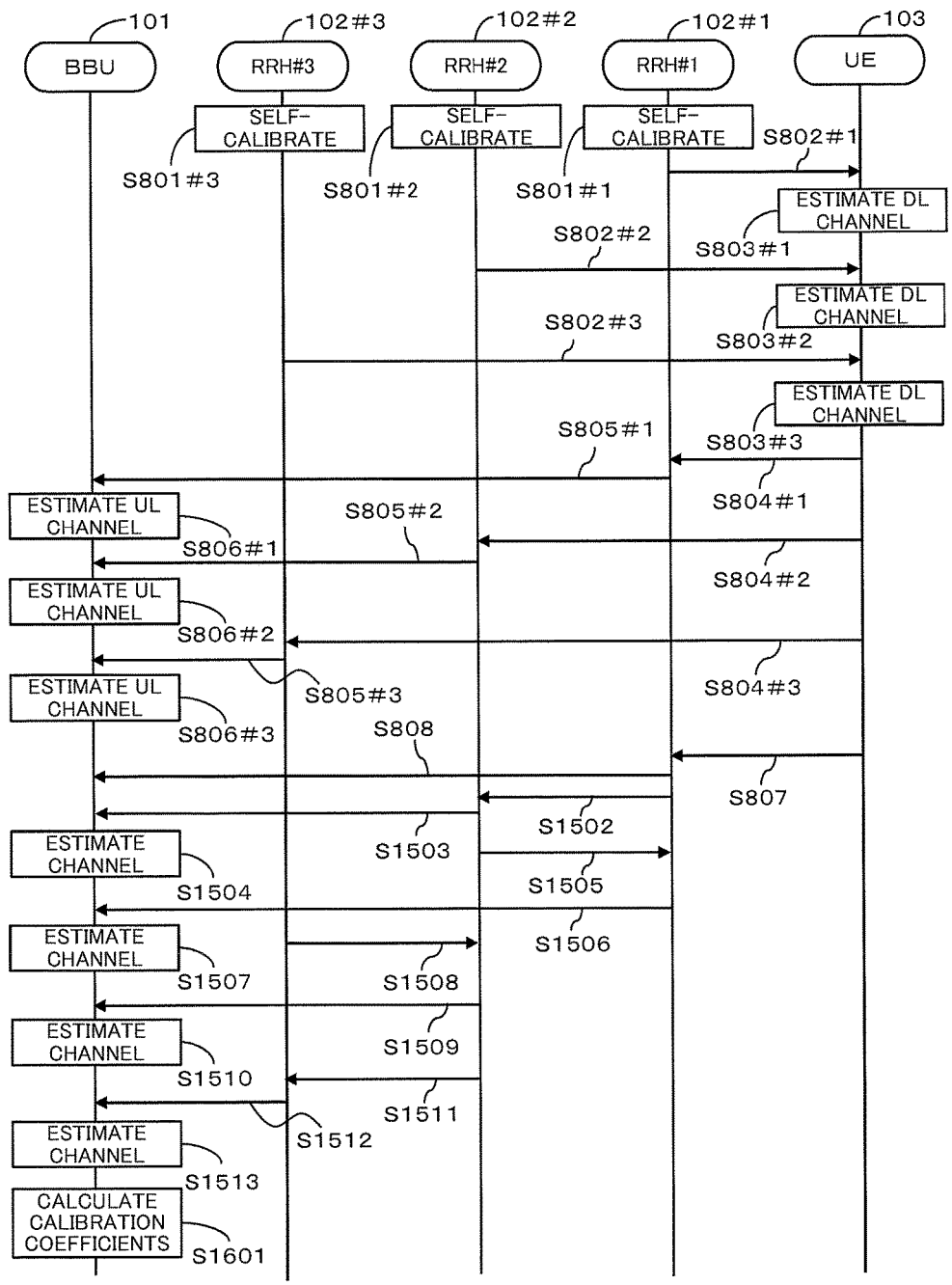
FIG. 16 is a sequence diagram of a calibration process according to a third embodiment.

FIG. 16 is a sequence diagram for explaining a calibration process performed by the base station 101, the transmission and reception points 102#1 to 102#3 and the wireless terminal 103 according to the third embodiment.

In steps S801#1 to S801#3, the transmission and reception points 102#1 to 102#3 perform self-calibration.

In step S802#1, the transmission and reception point 102#1 transmits a calibration signal to the wireless terminal 103, and, in step S803#1, a baseband processor 314 of the wireless terminal 103 performs DL channel estimation.

In step S802#2, the transmission and reception point 102#2 transmits a calibration signal to the wireless terminal 103, and, in step S803#2, the baseband processor 314 of the wireless terminal 103 performs DL channel estimation.

In step S802#3, beamforming is performed from the transmission and reception point 102#3 to transmit a calibration signal to the wireless terminal 103, and, in step S803#3, the baseband processor 314 of the wireless terminal 103 performs DL channel estimation.

In step S804#1, the wireless terminal 103 transmits a calibration signal to the transmission and reception point 102#1, and the transmission and reception point 102#1 receives the calibration signal by way of beamforming. In step S805#1, a baseband signal corresponding to the received calibration signal is transmitted to the baseband processor 301#1. In step S806#1, the baseband processor 301#1 performs UL channel estimation.

In step S804#2, the wireless terminal 103 transmits a calibration signal to the transmission and reception point 102#2, and the transmission and reception point 102#2 receives the calibration signal by way of beamforming. In step S805#2, a baseband signal corresponding to the received calibration signal is transmitted to the baseband processor 301#2. In step S806#2, the baseband processor 301#2 performs UL channel estimation.

In step S804#3, the wireless terminal 103 transmits a calibration signal to the transmission and reception point 102#3, and the transmission and reception point 102#3 receives the calibration signal by way of beamforming. In step S805#3, a baseband signal corresponding to the received calibration signal is transmitted to the baseband processor 301#3. In step S806#3, the baseband processor 301#3 performs UL channel estimation.

In step S807, the wireless terminal 103 transmits a DL channel estimation result to, for example, the transmission and reception point 102#1, and, in step S808, the DL channel estimation result is transmitted to the base station 101.

Steps S802#1 to S807 correspond to processes in the first embodiment, and this process can be repeatedly executed a number of times which corresponds to the number of wireless terminals 103. By using a plurality of wireless terminals 103, it is possible to increase calibration precision.

Steps S1502 to S1513 correspond to processes in the second embodiment, and are as described above.

In step S1601, calibration coefficients are calculated. In the present embodiment, calculation of the calibration coefficients corresponding to the first embodiment, and calculation of the calibration coefficients corresponding to the second embodiment are performed. Hence, it is also possible to calculate calibration coefficients by an arithmetic mean, and calculate calibration coefficients by performing arbitrary weighting. Consequently, it is possible to more accurately calculate calibration coefficients.

(Hardcore Configuration)

FIG. 17A is a hardware configuration diagram of the base station 101 and the transmission and reception point 102.

The base station 101 includes a processor 1701, a memory 1702, an LSI (Large Scale Integrated circuit) 1703 and a NIF (Network InterFace) circuit 1704. Further, the transmission and reception point 102#i includes an RF circuit 1705#i (i is a natural number).

The memory 1702 is configured by a volatile storage device such as a DRAM (Dynamic Random Memory), and a non-volatile storage device such as a hard disk, an optical disk or a magnetooptical disk. The memory 1702 can store programs, and executes the programs by the processor 1701 to control each unit of the base station 101 and receive an input of data and output data. Further, the memory 1702 provides a working area for executing the programs, and can store various setting parameters of the base station 101 and the transmission and reception point 102#i.

The LSI 1703 functions as a signal processing processor, and can operate as the baseband processor 301, for example. The NIF circuit 1704 is a circuit which realizes a core network interface 402.

In addition, hardware can also perform the same control as that executed by a program by using a FPGA (Field Programmable Gate Array) instead of causing the processor 1701 to execute the program. By using the FPGA, it is possible to realize the base station 101 without using the program.

The RF circuit 1705#i can be realized by combining a circuit which converts a baseband signal and a radio signal, and a radio circuit which processes the radio signal.

FIG. 17B is a hardware configuration diagram of the wireless terminal 103.

The wireless terminal 103 includes a processor 1711, a memory 1712, an RF circuit 1714 and an LSI 1713.

The memory 1712 is configured by a volatile storage device such as a DRAM and a non-volatile storage device such as a hard disk, an optical disk or a magnetooptical disk. The memory 1712 can store programs, and executes a program by the processor 1711 to control each unit of the wireless terminal 103 and receive an input of data and output data. Further, the memory 1712 provides a working area for executing the programs, and can store various setting parameters of the wireless terminal 103.

The LSI 1713 functions as a signal processing processor, and can operate as the baseband processor 314, for example.

The RF circuit 1714 can be realized by combining a circuit which converts a baseband signal and a radio signal, and a radio circuit which processes the radio signal.

In addition, hardware can also realize the same control as that executed by a program by using the FPGA instead of causing the processor 1711 to execute the program. By using the FPGA, it is possible to realize the wireless terminal 103 without using the programs.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A base station that is connected to a plurality of transmission-reception points, wherein each of the plurality of transmission-reception points comprises a plurality of antennas; and the base station comprises a calibrator that calculates calibration coefficients for correcting weights in beamforming communication at each of the plurality of transmission-reception points based on wireless characteristics obtained from the beamforming communication performed by each of the plurality of transmission-reception points after self-calibration performed by a self-calibrator on the plurality of antennas included in the transmission-reception point for improved beamforming.

2. The base station according to claim 1, wherein the beamforming communication at each of the plurality of transmission-reception points is time divisional duplex communication.

3. The base station according to claim 1, wherein
the beamforming communication at each of the plurality of transmission-reception points is communication between a wireless device located in an area of the base station and the plurality of transmission-reception points, and
the calibrator calculates the calibration coefficients based on downlink wireless characteristics from each of the plurality of transmission-reception points to the wireless device, and uplink wireless characteristics from the wireless device to each of the plurality of transmission-reception points.

4. The base station according to claim 3, wherein, when a number of the plurality of transmission-reception points is N, the downlink wireless characteristics from each of the plurality of transmission-recetion points to the wireless device are $f_{DL}^{(1)}, f_{DL}^{(2)}, f_{DL}^{(3)}, \ldots,$ and $f_{DL}^{(N)}$, and the uplink wireless characteristics from the wireless device to each of the plurality of transmission-reception points are $f_{UL}^{(1)}, f_{UL}^{(2)}, f_{UL}^{(3)}, \ldots,$ and $f_{UL}^{(N)}$, the calibrator calculates $c^{(1)}=1$, $c^{(2)}=(f_{DL}^{(1)}/f_{UL}^{(1)})/(f_{DL}^{(2)}/f_{UL}^{(2)})$, $c^{(3)}=(f_{DL}^{(1)}/f_{UL}^{(1)})/(f_{DL}^{(3)}/f_{UL}^{(3)})$, ..., and $c^{(N)}=(f_{DL}^{(1)}/f_{UL}^{(1)})/(f_{DL}^{(N)}/f_{UL}^{(N)})$ as the calibration coefficients $c^{(1)}, c^{(2)}, c^{(3)}, \ldots,$ and $c^{(N)}$.

5. The base station according to claim 1, wherein, when the plurality of transmission-reception points are $RRH^{(1)}$, $RRH^{(2)}$, $RRH^{(3)}, \ldots,$ and $RRH^{(N)}$, the beamforming communication at each of the plurality of transmission-reception points is communication between $RRH^{(1)}$ and $RRH^{(2)}$, $RRH^{(2)}$ and $RRH^{(3)}, \ldots,$ and $RRH^{(N-1)}$ and $RRH^{(N)}$, and wireless characteristics from $RRH^{(i)}$ to $RRH^{(i+1)}$ are $f_{DL}^{(i)}$ and wireless characteristics from the $RRH^{(i+1)}$ to the $RRH^{(i)}$ are $f_{UL}^{(i)}$, the calibrator calculates $d^{(1)}=1$, $d^{(2)}=(f_{DL}^{(1)}/f_{UL}^{(1)})/(f_{DL}^{(2)}/f_{UL}^{(2)})$, $d^{(3)}=(f_{DL}^{(2)}/f_{UL}^{(2)})/(f_{DL}^{(3)}/f_{UL}^{(3)})$, ..., and $d^{(N)}=(f_{DL}^{(N-1)}/f_{UL}^{(N-1)})/(f_{DL}^{(N)}/f_{UL}^{(N)})$ as coefficients $d^{(1)}, d^{(2)}, d^{(3)}, \ldots,$ and $d^{(N)}$, and calculates $c^{(1)}=d^{(1)}$, $c^{(2)}=d^{(2)} \times d^{(1)}$, $c^{(3)}=d^{(3)} \times d^{(2)} \times d^{(1)}$, ..., and $c^{(N)}=d^{(N)} \times d^{(N-1)} \times \ldots \times d^{(1)}$ as the calibration coefficients $c^{(1)}, c^{(2)}, c^{(3)}, \ldots,$ and $c^{(N)}$.

6. A wireless communication system comprising: a plurality of transmission-reception points; and a base station that is connected to the plurality of transmission-reception points, wherein the wireless communication system further comprises a calibrator that calculates calibration coefficients for correcting weights in beamforming communication at each of the plurality of transmission-reception points based on wireless characteristics obtained from the beamforming communication performed by each of the plurality of transmission-reception points after self-calibration performed by a self-calibrator on the plurality of antennas included in the transmission-reception point for improved beamforming.

7. The wireless communication system according to claim 6, wherein the beamforming communication at each of the plurality of transmission-reception point is time divisional duplex communication.

8. The wireless communication system according to claim 6, wherein
the beamforming communication at each of the plurality of transmission-reception points is communication between a wireless device located in an area of the base station and the plurality of transmission-reception points, and
the calibrator calculates the calibration coefficients based on downlink wireless characteristics from each of the plurality of transmission-reception points to the wireless device, and uplink wireless characteristics from the wireless device to each of the plurality of transmission-reception points.

9. The wireless communication system according to claim 8, wherein, when a number of the plurality of transmission-reception points is N, the downlink wireless characteristics from each of the plurality of transmission points to the wireless device are $f_{DL}^{(1)}, f_{DL}^{(2)}, f_{DL}^{(3)}, \ldots,$ and $f_{DL}^{(N)}$, and the uplink wireless characteristics from the wireless device to each of the plurality of transmission-reception points are $f_{UL}^{(1)}, f_{UL}^{(2)}, f_{UL}^{(3)}, \ldots,$ and $f_{UL}^{(N)}$, the calibrator calculates $$c^{(1)}=1,$$

$$c^{(2)}=(f_{DL}^{(1)}/f_{UL}^{(1)})/(f_{DL}^{(2)}/f_{UL}^{(2)}),$$

$$c^{(3)}=(f_{DL}^{(1)}/f_{UL}^{(1)})/(f_{DL}^{(3)}/f_{UL}^{(3)}),$$

..., and $$c^{(N)}=(f_{DL}^{(1)}/f_{UL}^{(1)})/(f_{DL}^{(N)}/f_{UL}^{(N)})$$ as the calibration coefficients $c^{(1)}, c^{(2)}, c^{(3)}, \ldots,$ and $c^{(N)}$.

10. The wireless communication system according to claim 6, wherein, when the plurality of transmission-reception points are $RRH^{(1)}, RRH^{(2)}, RRH^{(3)}, \ldots,$ and $RRH^{(N)}$, the beamforming communication at each of the plurality of transmission-reception points is communication between $RRH^{(1)}$ and $RRH^{(2)}$, $RRH^{(2)}$ and $RRH^{(3)}$, ..., and $RRH^{(N-1)}$ and $RRH^{(N)}$, and wireless characteristics from $RRH^{(i)}$ to $RRH^{(i+1)}$ are $f_{DL}^{(i)}$ and wireless characteristics from the $RRH^{(i+1)}$ to the $RRH^{(i)}$ are $f_{UL}^{(i)}$, the calibrator calculates $$d^{(1)}=1,$$

$$d^{(2)}=(f_{DL}^{(1)}/f_{UL}^{(1)})/(f_{DL}^{(2)}/f_{UL}^{(2)}),$$

$$d^{(3)}=(f_{DL}^{(2)}/f_{UL}^{(2)})/(f_{DL}^{(3)}/f_{UL}^{(3)}),$$

..., and $$d^{(N)}=(f_{DL}^{(N-1)}/f_{UL}^{(N-1)})/(f_{DL}^{(N)}/f_{UL}^{(N)})$$ as coefficients $d^{(1)}, d^{(2)}, d^{(3)}, \ldots,$ and $d^{(N)}$, and calculates $$c^{(1)}=d^{(1)},$$

$$c^{(2)}=d^{(2)}\times d^{(1)},$$

$$c^{(3)}=d^{(3)}\times d^{(2)}\times d^{(1)},$$

..., and $$c^{(N)}=d^{(N)}\times d^{(N-1)}\times \ldots \times d^{(1)}$$ as the calibration coefficients $c^{(1)}, c^{(2)}, c^{(3)}, \ldots,$ and $c^{(N)}$.

11. A calibrating method of a wireless communication system that comprises a base station connected to a plurality of transmission-reception points, wherein each of the plurality of transmission-reception points comprises a plurality of antennas; and the calibrating method comprises: performing beamforming communication from each of the plurality of transmission-reception points; and calculating calibration coefficients for correcting weights in the beamforming communication at each of the plurality of transmission-reception points based on wireless characteristics obtained from the beamforming communication performed by each of the plurality of transmission-reception points after self-calibration performed by a self-calibrator on the plurality of antennas included in the transmission-reception point for improved beamforming.

12. The calibrating method of the wireless communication system according to claim 11, wherein the beamforming communication at each of the plurality of transmission-reception points is time divisional duplex communication.

13. The calibrating method of the wireless communication system according to claim 11, wherein
the beamforming communication at each of the plurality of transmission-reception points is communication between a wireless device located in an area of the base station and the plurality of transmission-reception points, and
the calibrator calculates the calibration coefficients based on downlink wireless characteristics from each of the plurality of transmission-reception points to the wireless device, and uplink wireless characteristics from the wireless device to each of the plurality of transmission-reception points.

14. The calibrating method of the wireless communication system according to claim 13, wherein, when a number of the plurality of transmission-reception points is N, the downlink wireless characteristics from each of the plurality of transmission-reception points to the wireless device are $f_{DL}^{(1)}, f_{DL}^{(2)}, f_{DL}^{(3)}, \ldots,$ and $f_{DL}^{(N)}$, and the uplink wireless characteristics from the wireless device to each of the plurality of transmission-reception points are $f_{UL}^{(1)}, f_{UL}^{(2)}, f_{UL}^{(3)}, \ldots,$ and $f_{UL}^{(N)}$, the calibrator calculates $$c^{(1)}=1,$$

$$c^{(2)}=(f_{DL}^{(1)}/f_{UL}^{(1)})/(f_{DL}^{(2)}/f_{UL}^{(2)}),$$

$$c^{(3)}=(f_{DL}^{(1)}/f_{UL}^{(1)})/(f_{DL}^{(3)}/f_{UL}^{(3)}),$$

..., and $$c^{(N)}=(f_{DL}^{(1)}/f_{UL}^{(1)})/(f_{DL}^{(N)}/f_{UL}^{(N)})$$ as the calibration coefficients $c^{(1)}, c^{(2)}, c^{(3)}, \ldots,$ and $c^{(N)}$.

15. The calibrating method of the wireless communication system according to claim 11, wherein, when the plurality of transmission-reception points are $RRH^{(1)}, RRH^{(2)}, RRH^{(3)}, \ldots,$ and $RRH^{(N)}$, the beamforming communication at each of the plurality of transmission-reception points is communication between $RRH^{(1)}$ and $RRH^{(2)}$, $RRH^{(2)}$ and $RRH^{(3)}$, ..., and $RRH^{(N-1)}$ and $RRH^{(N)}$, and wireless characteristics from RRH0) to $RRH^{(i+1)}$ are $f_{DL}^{(i)}$ and wireless characteristics from the $RRH^{(i+1)}$ to the $RRH^{(i)}$ are $f_{UL}^{(i)}$, the calibrator calculates $$d^{(1)}=1,$$

$$d^{(2)}=(f_{DL}^{(1)}/f_{UL}^{(1)})/(f_{DL}^{(2)}/f_{UL}^{(2)}),$$

$$d^{(3)}=(f_{DL}^{(2)}/f_{UL}^{(2)})/(f_{DL}^{(3)}/f_{UL}^{(3)}),$$

..., and $$d^{(N)}=(f_{DL}^{(N-1)}/f_{UL}^{(N-1)})/(f_{DL}^{(N)}/f_{UL}^{(N)})$$ as coefficients $d^{(1)}, d^{(2)}, d^{(3)}, \ldots,$ and $d^{(N)}$, and calculates $$c^{(1)}=d^{(1)},$$

$$c^{(2)}=d^{(2)}\times d^{(1)},$$

$$c^{(3)}=d^{(3)}\times d^{(2)}\times d^{(1)},$$

..., and $$c^{(N)}=d^{(N)}\times d^{(N-1)}\times \ldots \times d^{(1)}$$ as the calibration coefficients $c^{(1)}, c^{(2)}, c^{(3)}, \ldots,$ and $c^{(N)}$.

* * * * *